US012324044B2

(12) United States Patent
Palat et al.

(10) Patent No.: US 12,324,044 B2
(45) Date of Patent: *Jun. 3, 2025

(54) SMALL DATA TRANSMISSION (SDT) PROCEDURES AND FAILURE RECOVERY DURING AN INACTIVE STATE

(71) Applicant: Intel Corporation, Santa Clara, CA (US)

(72) Inventors: Sudeep K. Palat, Cheltenham (GB); Yi Guo, Shanghai (CN); Marta Martinez Tarradell, Hillsboro, OR (US); Sangeetha L. Bangolae, Portland, OR (US); Ansab Ali, Hillsboro, OR (US); Seau S. Lim, Swindon (GB); Youn Hyoung Heo, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/604,121

(22) Filed: Mar. 13, 2024

(65) Prior Publication Data
US 2024/0314873 A1   Sep. 19, 2024

Related U.S. Application Data

(63) Continuation of application No. 17/504,232, filed on Oct. 18, 2021, now Pat. No. 11,963,248.

(Continued)

(51) Int. Cl.
*H04W 76/19* (2018.01)
*H04W 12/041* (2021.01)
(Continued)

(52) U.S. Cl.
CPC ......... *H04W 76/19* (2018.02); *H04W 12/041* (2021.01); *H04W 12/0431* (2021.01); *H04W 28/06* (2013.01); *H04W 76/30* (2018.02)

(58) Field of Classification Search
CPC ..... H04W 76/19; H04W 76/30; H04W 28/06; H04W 12/041; H04W 12/0431
See application file for complete search history.

(56) References Cited

U.S. PATENT DOCUMENTS 8,867,476 B2   10/2014   Jain et al.
9,100,160 B2   8/2015   Martinez Tarradell et al.
(Continued)

OTHER PUBLICATIONS

U.S. Appl. No. 17/504,232 U.S. Pat. No. 11,963,248, Oct. 18, 2021, Small Data Transmission (SDT) Procedures and Failure Recovery During an Inactive State.
(Continued)

*Primary Examiner* — Brenda H Pham
(74) *Attorney, Agent, or Firm* — Schwegman Lundberg & Woessner, P.A.

(57) ABSTRACT

A computer-readable storage medium stores instructions for execution by one or more processors of a UE. The instructions configure the UE for small data transmission (SDT) in a 5G NR network and cause the UE to perform operations comprising detecting while in an RRC_Inactive state, a radio link failure during a first SDT of UL data to a base station. A secure key for a second SDT is generated based on the radio link failure. A configuration message including an indication of the second SDT is transmitted to the base station. A response message including a UL grant is received from the base station. The UL data is encoded for the second SDT using the secure key. The second SDT is performed using the UL grant while the UE is in the RRC_Inactive state.

20 Claims, 11 Drawing Sheets

Related U.S. Application Data

(60) Provisional application No. 63/094,696, filed on Oct. 21, 2020.

(51) Int. Cl.
*H04W 12/0431* (2021.01)
*H04W 28/06* (2009.01)
*H04W 76/30* (2018.01)

(56) References Cited

U.S. PATENT DOCUMENTS

| | | |
|---|---|---|
| 9,225,399 B2 | 12/2015 | Shan et al. |
| 9,681,354 B2 | 6/2017 | Bangolae et al. |
| 11,963,248 B2 * | 4/2024 | Palat ................... H04W 76/19 |
| 2013/0016602 A1 | 1/2013 | Diachina et al. |
| 2013/0272148 A1 | 10/2013 | Fong et al. |
| 2014/0334380 A1 | 11/2014 | Pinheiro et al. |
| 2016/0029417 A1 | 1/2016 | Vannithamby et al. |
| 2016/0374048 A1 | 12/2016 | Griot et al. |
| 2019/0159168 A1 | 5/2019 | Wang et al. |
| 2022/0039192 A1 | 2/2022 | Palat et al. |

OTHER PUBLICATIONS

"U.S. Appl. No. 17/504,232, Notice of Allowance mailed Dec. 13, 2023", 9 pgs.

\* cited by examiner

SMALL DATA TRANSMISSION (SDT) PROCEDURES AND FAILURE RECOVERY DURING AN INACTIVE STATE

PRIORITY CLAIM

This application is a continuation of U.S. application Ser. No. 17/504,232, filed Oct. 18, 2021, which claims the benefit of priority under 35 U.S.C. 119(e) to U.S. Provisional Patent Application No. 63/094,696, filed Oct. 21, 2020, and entitled "SMALL DATA TRANSMISSIONS PROCEDURES AND FAILURE RECOVERY MECHANISM TO EXCHANGE MULTIPLE UL AND DL WHILE UE IS IN INACTIVE," all of which are incorporated herein by reference in their entirety.

TECHNICAL FIELD

Aspects pertain to wireless communications. Some aspects relate to wireless networks including 3GPP (Third Generation Partnership Project) networks, 3GPP LTE (Long Term Evolution) networks, 3GPP LTE-A (LTE Advanced) networks, (MultiFire, LTE-U), and fifth-generation (5G) networks including 5G new radio (NR) (or 5G-NR) networks, 5G-LTE networks such as 5G NR unlicensed spectrum (NR-U) networks and other unlicensed networks including Wi-Fi, CBRS (OnGo), etc. Other aspects are directed to small data transmission (SDT) procedures and failure recovery mechanisms associated with communication of uplink (UL) and downlink (DL) data while a user equipment (UE) is in an inactive state.

BACKGROUND

Mobile communications have evolved significantly from early voice systems to today's highly sophisticated integrated communication platform. With the increase in different types of devices communicating with various network devices, usage of 3GPP LTE systems has increased. The penetration of mobile devices (user equipment or UEs) in modern society has continued to drive demand for a wide variety of networked devices in many disparate environments. Fifth-generation (5G) wireless systems are forthcoming and are expected to enable even greater speed, connectivity, and usability. Next generation 5G networks (or NR networks) are expected to increase throughput, coverage, and robustness and reduce latency and operational and capital expenditures. 5G-NR networks will continue to evolve based on 3GPP LTE-Advanced with additional potential new radio access technologies (RATs) to enrich people's lives with seamless wireless connectivity solutions delivering fast, rich content and services. As current cellular network frequency is saturated, higher frequencies, such as millimeter wave (mmWave) frequency, can be beneficial due to their high bandwidth.

Potential LTE operation in the unlicensed spectrum includes (and is not limited to) the LTE operation in the unlicensed spectrum via dual connectivity (DC), or DC-based LAA, and the standalone LTE system in the unlicensed spectrum, according to which LTE-based technology solely operates in the unlicensed spectrum without requiring an "anchor" in the licensed spectrum, called MultiFire. MultiFire combines the performance benefits of LTE technology with the simplicity of Wi-Fi-like deployments.

Further enhanced operation of LTE and NR systems in the licensed, as well as unlicensed spectrum, is expected in future releases and 5G (and beyond) communication systems. Such enhanced operations can include techniques for SDT procedures and failure recovery mechanisms associated with communication of UL and DL data while a UE is in an inactive state.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION

The following description and the drawings sufficiently illustrate aspects to enable those skilled in the art to practice them. Other aspects may incorporate structural, logical, electrical, process, and other changes. Portions and features of some aspects may be included in or substituted for, those of other aspects. Aspects outlined in the claims encompass all available equivalents of those claims.

Figure 1A:
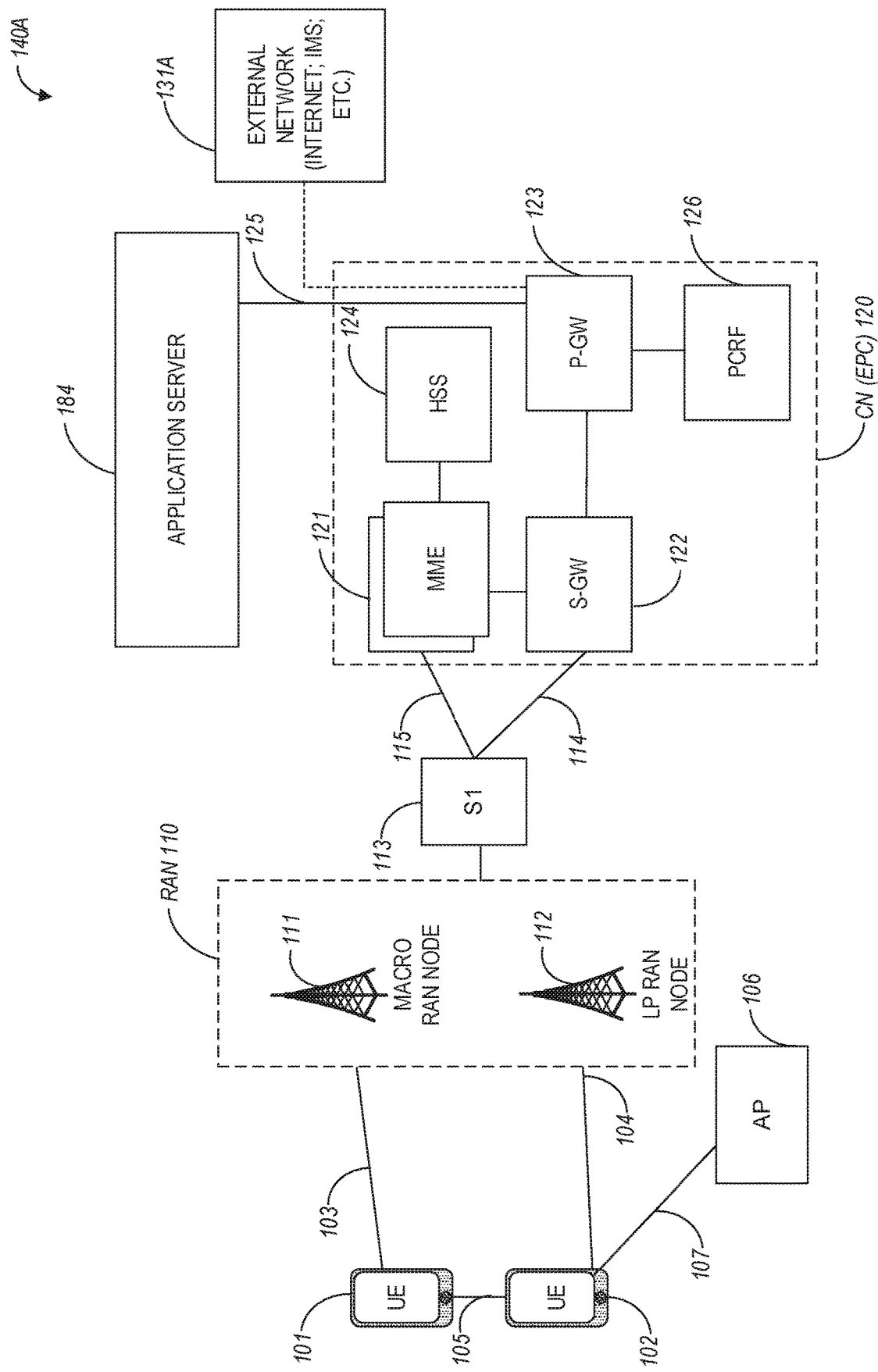
FIG. 1A illustrates an architecture of a network, in accordance with some aspects.

FIG. 1A illustrates an architecture of a network in accordance with some aspects. The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as Personal Data Assistants (PDAs), pagers, laptop computers, desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard.

LTE and LTE-Advanced are standards for wireless communications of high-speed data for UE such as mobile telephones. In LTE-Advanced and various wireless systems, carrier aggregation is a technology according to which multiple carrier signals operating on different frequencies may be used to carry communications for a single UE, thus increasing the bandwidth available to a single device. In some aspects, carrier aggregation may be used where one or more component carriers operate on unlicensed frequencies.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHZ, 3.6-3.8 GHz, and further frequencies and Spectrum Access System (SAS) in 3.55-3.7 GHZ and further frequencies).

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe), or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, a Universal Mobile Telecommunications System (UMTS), an Evolved Universal Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth-generation (5G) protocol, a New Radio (NR) protocol, and the like.

In an aspect, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable connections 103 and 104. These access nodes (ANs) can be referred to as base stations (BSs), NodeBs, evolved NodeBs (eNBs), Next Generation NodeBs (gNBs), RAN network nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112 or an unlicensed spectrum based secondary RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management, and data packet scheduling, and mobility management. In an example, any of the nodes 111 and/or 112 can be a new generation Node-B (gNB), an evolved node-B (eNB), or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries user traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the SI interface 113 towards the RAN 110, and route data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include lawful intercept, charging, and some policy enforcement.

The P-GW 123 may terminate an SGi interface toward a PDN. The P-GW 123 may route data packets between the EPC network 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VOIP) sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G network, including a 5G new radio network using communications in the licensed (5G NR) and the unlicensed (5G NR-U) spectrum. One of the current enablers of IoT is the narrowband-IoT (NB-IoT).

An NG system architecture can include the RAN 110 and a 5G network core (5GC) 120. The NG-RAN 110 can include a plurality of nodes, such as gNBs and NG-eNBs. The core network 120 (e.g., a 5G core network or 5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes as provided by 3GPP Technical Specification (TS) 23.501 (e.g., V15.4.0, 2018-12). In some aspects, each of the gNBs and the NG-eNBs can be implemented as a base station, a mobile edge server, a small cell, a home eNB, a RAN network node, and so forth. In some aspects, a gNB can be a master node (MN) and NG-eNB can be a secondary node (SN) in a 5G architecture. In some aspects, the master/primary node may operate in a licensed band and the secondary node may operate in an unlicensed band.

Figure 1B:
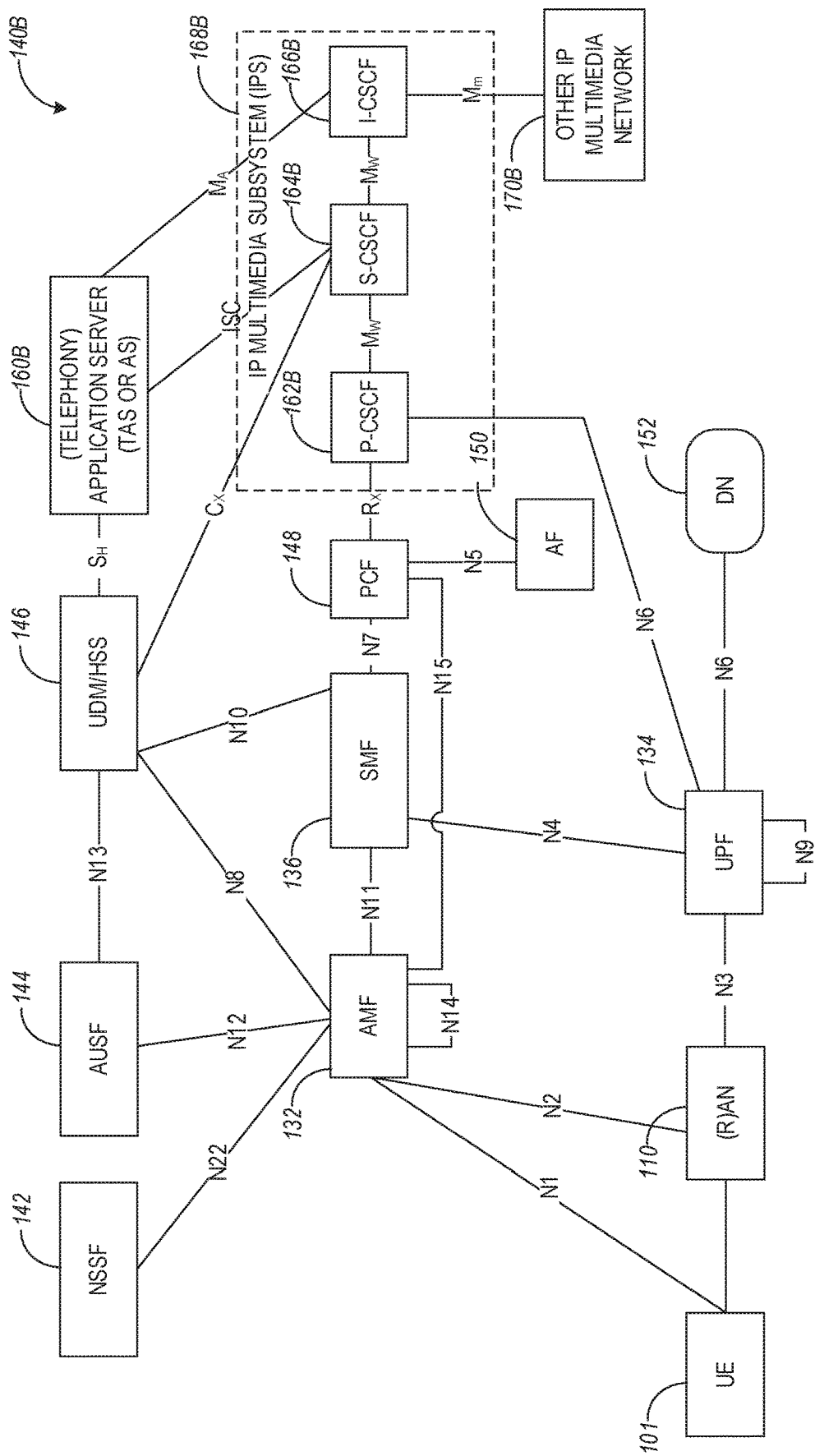
FIG. 1B and FIG. 1C illustrate a non-roaming 5G system architecture in accordance with some aspects.

FIG. 1B illustrates a non-roaming 5G system architecture in accordance with some aspects. Referring to FIG. 1B, there is illustrated a 5G system architecture 140B in a reference point representation. More specifically, UE 102 can be in communication with RAN 110 as well as one or more other 5G core (5GC) network entities. The 5G system architecture 140B includes a plurality of network functions (NFs), such as access and mobility management function (AMF) 132, session management function (SMF) 136, policy control function (PCF) 148, application function (AF) 150, user plane function (UPF) 134, network slice selection function (NSSF) 142, authentication server function (AUSF) 144, and unified data management (UDM)/home subscriber server (HSS) 146. The UPF 134 can provide a connection to a data network (DN) 152, which can include, for example, operator services, Internet access, or third-party services. The AMF 132 can be used to manage access control and mobility and can also include network slice selection functionality. The SMF 136 can be configured to set up and manage various sessions according to network policy. The UPF 134 can be deployed in one or more configurations according to the desired service type. The PCF 148 can be configured to provide a policy framework using network slicing, mobility management, and roaming (similar to PCRF in a 4G communication system). The UDM can be configured to store subscriber profiles and data (similar to an HSS in a 4G communication system).

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the IM subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6 (between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
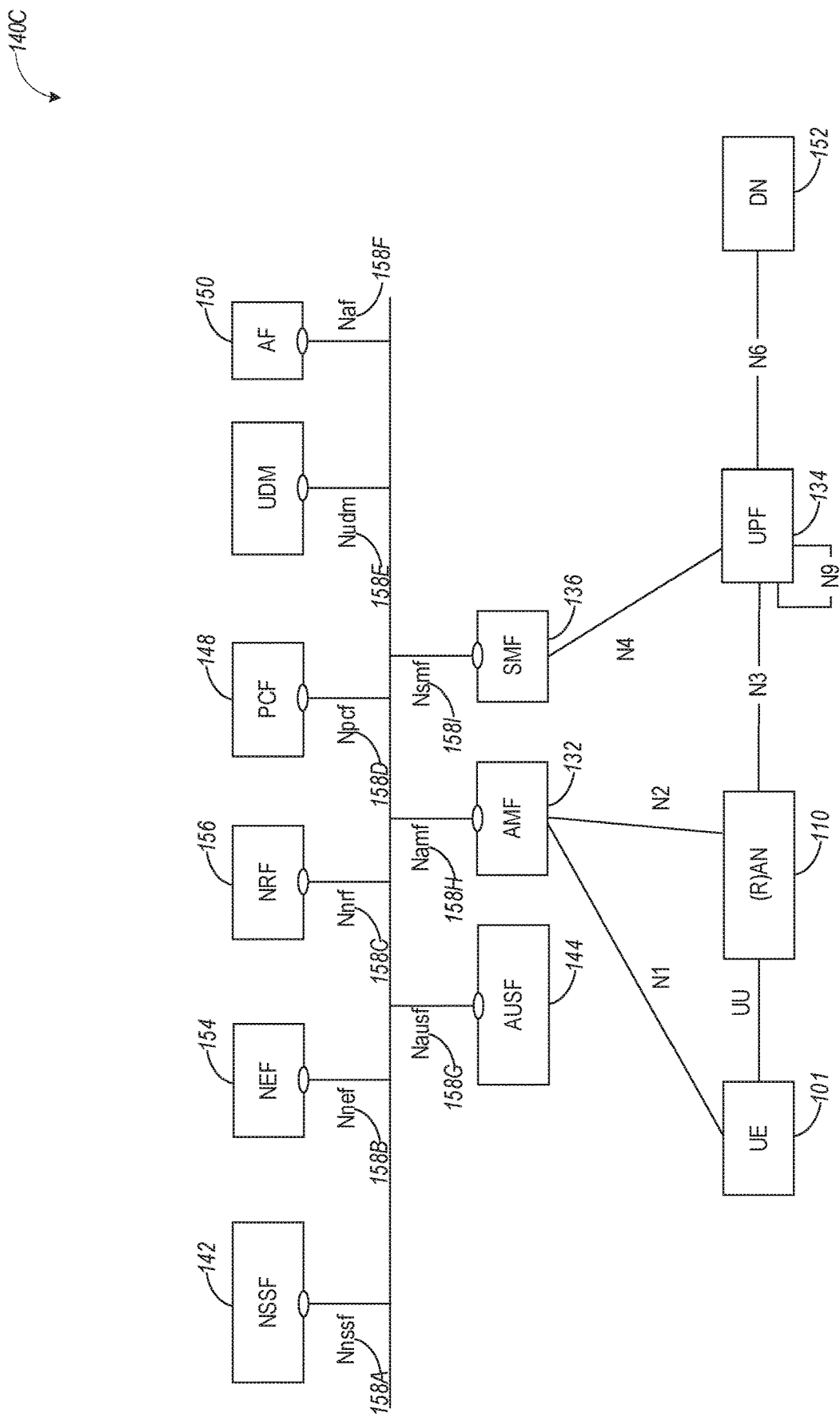

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

Figure 2:
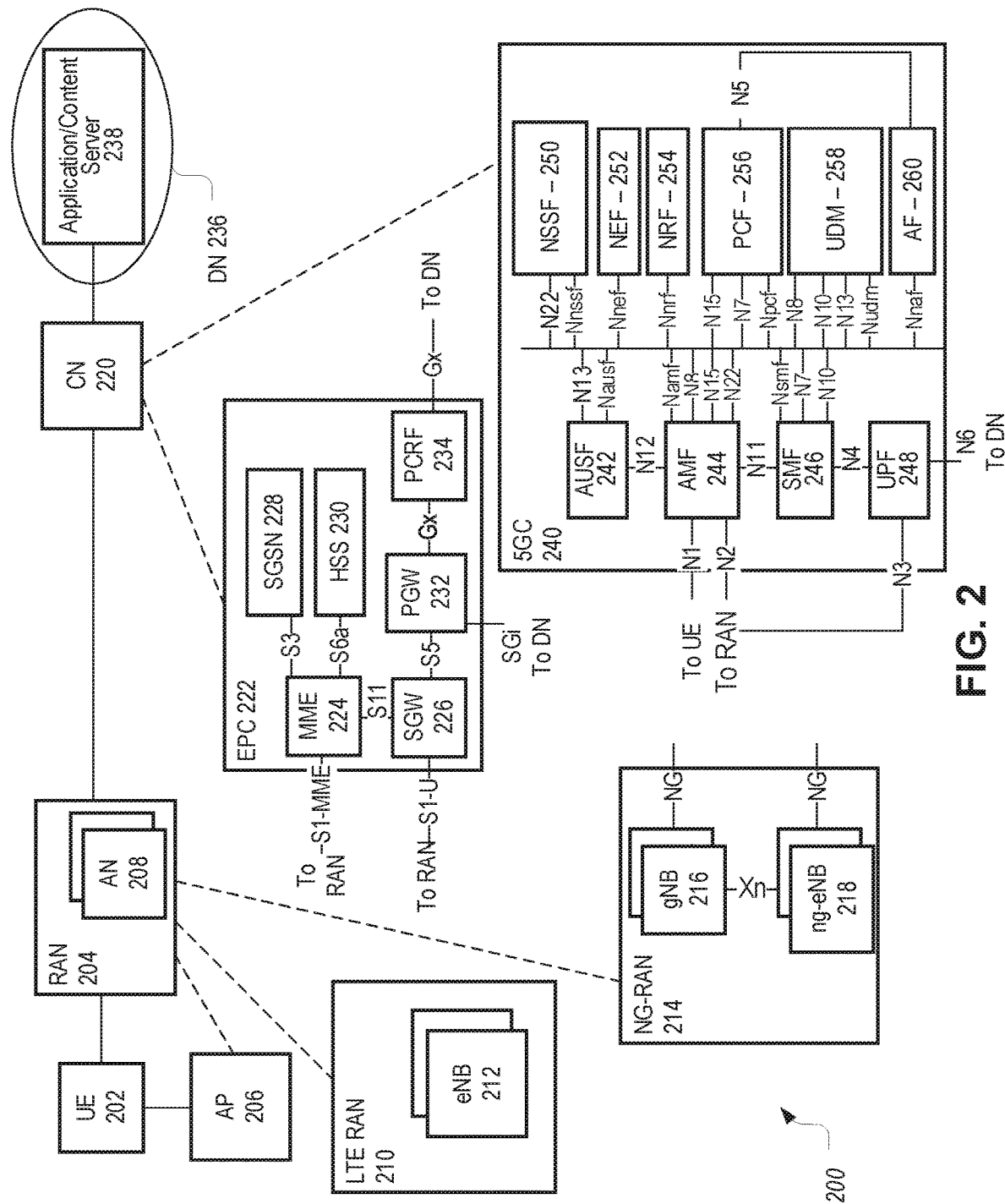
FIG. 2, FIG. 3, and FIG. 4 illustrate various systems, devices, and components that may implement aspects of disclosed embodiments.
Figure 3:
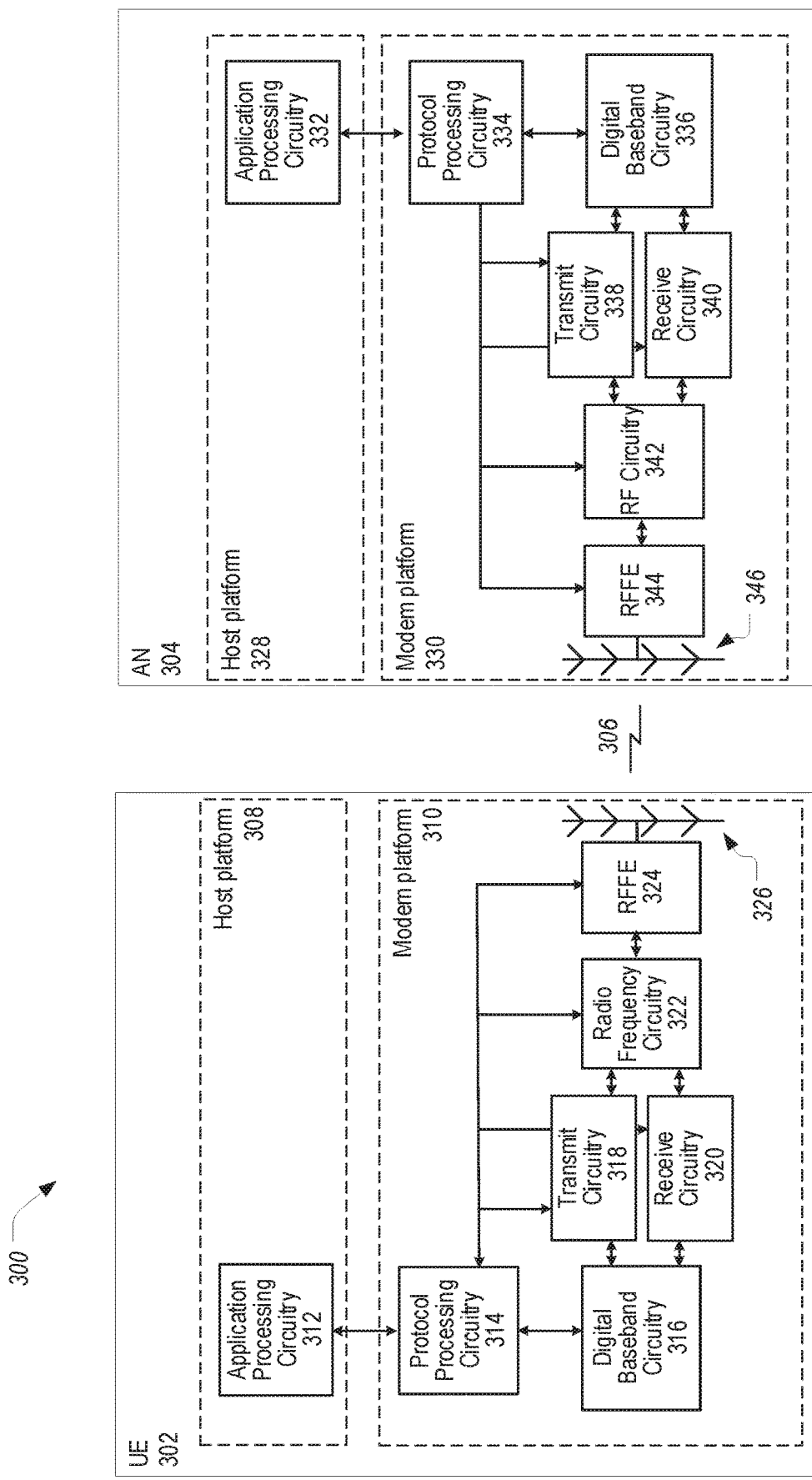
Figure 4:
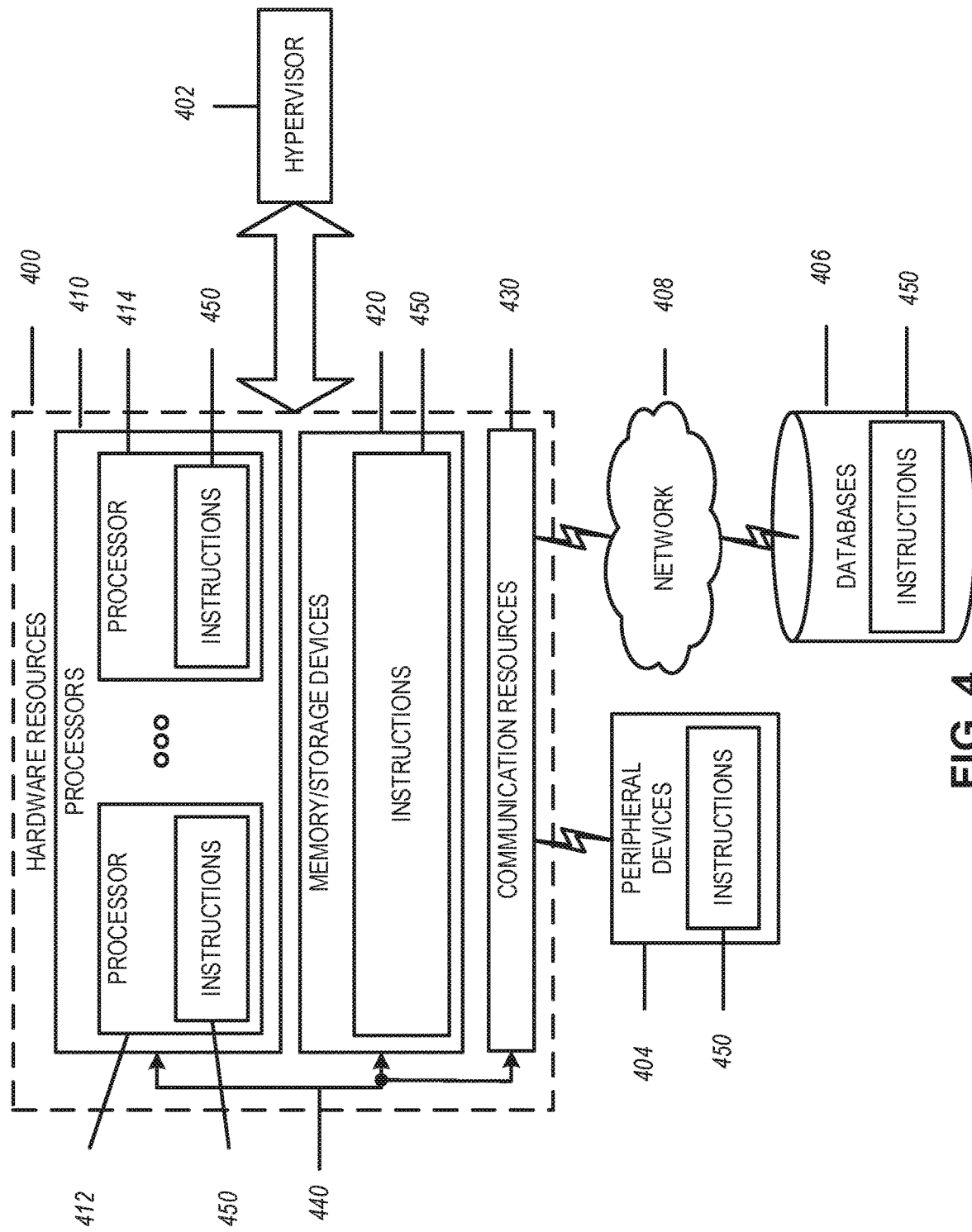

FIG. 2, FIG. 3, and FIG. 4 illustrate various systems, devices, and components that may implement aspects of disclosed embodiments. More specifically, UEs and/or base stations (such as gNBs) discussed in connection with FIGS. 1A-4 can be configured to perform the disclosed techniques.

FIG. 2 illustrates a network 200 in accordance with various embodiments. The network 200 may operate in a manner consistent with 3GPP technical specifications for LTE or 5G/NR systems. However, the example embodiments are not limited in this regard and the described embodiments may apply to other networks that benefit from the principles described herein, such as future 3GPP systems, or the like.

The network 200 may include a UE 202, which may include any mobile or non-mobile computing device designed to communicate with a RAN 204 via an over-the-air connection. The UE 202 may be, but is not limited to, a smartphone, tablet computer, wearable computing device, desktop computer, laptop computer, in-vehicle infotainment, in-car entertainment device, instrument cluster, head-up display device, onboard diagnostic device, dashtop mobile equipment, mobile data terminal, electronic engine management system, electronic/engine control unit, electronic/engine control module, embedded system, sensor, microcontroller, control module, engine management system, networked appliance, machine-type communication device, M2M or D2D device, IoT device, etc.

In some embodiments, the network 200 may include a plurality of UEs coupled directly with one another via a sidelink interface. The UEs may be M2M/D2D devices that communicate using physical sidelink channels such as but not limited to, PSBCH, PSDCH, PSSCH, PSCCH, PSFCH, etc.

In some embodiments, the UE 202 may additionally communicate with an AP 206 via an over-the-air connection. The AP 206 may manage a WLAN connection, which may serve to offload some/all network traffic from the RAN 204. The connection between the UE 202 and the AP 206 may be consistent with any IEEE 802.11 protocol, wherein the AP 206 could be a wireless fidelity (Wi-Fi®) router. In some embodiments, the UE 202, RAN 204, and AP 206 may utilize cellular-WLAN aggregation (for example, LWA/LWIP). Cellular-WLAN aggregation may involve the UE 202 being configured by the RAN 204 to utilize both cellular radio resources and WLAN resources.

The RAN 204 may include one or more access nodes, for example, access node (AN) 208. AN 208 may terminate air-interface protocols for the UE 202 by providing access stratum protocols including RRC, Packet Data Convergence Protocol (PDCP), Radio Link Control (RLC), MAC, and L1 protocols. In this manner, the AN 208 may enable data/voice connectivity between the core network (CN) 220 and the UE 202. In some embodiments, the AN 208 may be implemented in a discrete device or as one or more software entities running on server computers as part of, for example, a virtual network, which may be referred to as a CRAN or virtual baseband unit pool. The AN 208 be referred to as a BS, gNB, RAN node, eNB, ng-eNB, NodeB, RSU, TRxP, TRP, etc. The AN 208 may be a macrocell base station or a low-power base station for providing femtocells, picocells, or other like cells having smaller coverage areas, smaller user capacity, or higher bandwidth compared to macrocells.

In embodiments in which the RAN 204 includes a plurality of ANs, they may be coupled with one another via an X2 interface (if the RAN 204 is an LTE RAN) or an Xn interface (if the RAN 204 is a 5G RAN). The X2/Xn interfaces, which may be separated into control/user plane interfaces in some embodiments, may allow the ANs to communicate information related to handovers, data/context transfers, mobility, load management, interference coordination, etc.

The ANs of the RAN 204 may each manage one or more cells, cell groups, component carriers, etc. to provide the UE 202 with an air interface for network access. The UE 202 may be simultaneously connected with a plurality of cells provided by the same or different ANs of the RAN 204. For example, the UE 202 and RAN 204 may use carrier aggregation to allow the UE 202 to connect with a plurality of component carriers, each corresponding to a Pcell or Scell. In dual connectivity scenarios, a first AN may be a master node that provides an MCG and a second AN may be a secondary node that provides an SCG. The first/second ANs may be any combination of eNB, gNB, ng-eNB, etc.

The RAN 204 may provide the air interface over a licensed spectrum or an unlicensed spectrum. To operate in the unlicensed spectrum, the nodes may use LAA, eLAA, and/or feLAA mechanisms based on CA technology with PCells/Scells. Before accessing the unlicensed spectrum, the nodes may perform medium/carrier-sensing operations based on, for example, a listen-before-talk (LBT) protocol.

In V2X scenarios, the UE 202 or AN 208 may be or act as a roadside unit (RSU), which may refer to any transportation infrastructure entity used for V2X communications. An RSU may be implemented in or by a suitable AN or a stationary (or relatively stationary) UE. An RSU implemented in or by: a UE may be referred to as a "UE-type RSU"; an eNB may be referred to as an "eNB-type RSU"; a gNB may be referred to as a "gNB-type RSU"; and the like. In one example, an RSU is a computing device coupled with radio frequency circuitry located on a roadside that provides connectivity support to passing vehicle UEs. The RSU may also include internal data storage circuitry to store intersection map geometry, traffic statistics, media, as well as applications/software to sense and control ongoing vehicular and pedestrian traffic. The RSU may provide very low latency communications required for high-speed events, such as crash avoidance, traffic warnings, and the like. Additionally, or alternatively, the RSU may provide other cellular/WLAN communications services. The components of the RSU may be packaged in a weatherproof enclosure suitable for outdoor installation and may include a network interface controller to provide a wired connection (e.g., Ethernet) to a traffic signal controller or a backhaul network.

In some embodiments, the RAN 204 may be an LTE RAN 210 with eNBs, for example, eNB 212. The LTE RAN 210 may provide an LTE air interface with the following characteristics: sub-carrier spacing (SCS) of 15 kHz; CP-OFDM waveform for downlink (DL) and SC-FDMA waveform for uplink (UL); turbo codes for data and TBCC for control; etc. The LTE air interface may rely on CSI-RS for CSI acquisition and beam management; PDSCH/PDCCH DMRS for PDSCH/PDCCH demodulation; and CRS for cell search and initial acquisition, channel quality measurements, and channel estimation for coherent demodulation/detection at the UE. The LTE air interface may operate on sub-6 GHz bands.

In some embodiments, the RAN 204 may be an NG-RAN 214 with gNBs, for example, gNB 216, or ng-eNBs, for example, ng-eNB 218. The gNB 216 may connect with 5G-enabled UEs using a 5G NR interface. The gNB 216 may connect with a 5G core through an NG interface, which may include an N2 interface or an N3 interface. The ng-eNB 218 may also connect with the 5G core through an NG interface but may connect with a UE via an LTE air interface. The gNB 216 and the ng-eNB 218 may connect over an Xn interface.

In some embodiments, the NG interface may be split into two parts, an NG user plane (NG-U) interface, which carries traffic data between the nodes of the NG-RAN 214 and a UPF 248 (e.g., N3 interface), and an NG control plane (NG-C) interface, which is a signaling interface between the nodes of the NG-RAN 214 and an AMF 244 (e.g., N2 interface).

The NG-RAN 214 may provide a 5G-NR air interface with the following characteristics: variable SCS; CP-OFDM for DL, CP-OFDM and DFT-s-OFDM for UL; polar, repetition, simplex, and Reed-Muller codes for control and LDPC for data. The 5G-NR air interface may rely on CSI-RS, PDSCH/PDCCH DMRS similar to the LTE air interface. The 5G-NR air interface may not use a CRS but may use PBCH DMRS for PBCH demodulation; PTRS for phase tracking for PDSCH and tracking reference signal for time tracking. The 5G-NR air interface may operate on FR1 bands that include sub-6 GHz bands or FR2 bands that include bands from 24.25 GHZ to 52.6 GHz. The 5G-NR air interface may include a synchronization signal and physical broadcast channel (SS/PBCH) block (SSB) that is an area of a downlink resource grid that includes PSS/SSS/PBCH.

In some embodiments, the 5G-NR air interface may utilize BWPs (bandwidth parts) for various purposes. For example, BWP can be used for dynamic adaptation of the SCS. For example, the UE 202 can be configured with multiple BWPs where each BWP configuration has a different SCS. When a BWP change is indicated to the UE 202, the SCS of the transmission is changed as well. Another use case example of BWP is related to power saving. In particular, multiple BWPs can be configured for the UE 202 with different amounts of frequency resources (for example, PRBs) to support data transmission under different traffic loading scenarios. A BWP containing a smaller number of PRBs can be used for data transmission with a small traffic load while allowing power saving at the UE 202 and in some cases at the gNB 216. A BWP containing a larger number of PRBs can be used for scenarios with higher traffic loads.

The RAN 204 is communicatively coupled to CN 220 that includes network elements to provide various functions to support data and telecommunications services to customers/subscribers (for example, users of UE 202). The components of the CN 220 may be implemented in one physical node or separate physical nodes. In some embodiments, NFV may be utilized to virtualize any or all of the functions provided by the network elements of the CN 220 onto physical compute/storage resources in servers, switches, etc. A logical instantiation of the CN 220 may be referred to as a network slice, and a logical instantiation of a portion of the CN 220 may be referred to as a network sub-slice.

In some embodiments, the CN 220 may be connected to the LTE radio network as part of the Enhanced Packet System (EPS) 222, which may also be referred to as an EPC (or enhanced packet core). The EPC 222 may include MME 224, SGW 226, SGSN 228, HSS 230, PGW 232, and PCRF 234 coupled with one another over interfaces (or "reference points") as shown. Functions of the elements of the EPC 222 may be briefly introduced as follows.

The MME 224 may implement mobility management functions to track the current location of the UE 202 to facilitate paging, bearer activation/deactivation, handovers, gateway selection, authentication, etc.

The SGW 226 may terminate an SI interface toward the RAN and route data packets between the RAN and the EPC 222. The SGW 226 may be a local mobility anchor point for inter-RAN node handovers and also may provide an anchor for inter-3GPP mobility. Other responsibilities may include lawful intercept, charging, and some policy enforcement.

The SGSN 228 may track the location of the UE 202 and perform security functions and access control. In addition, the SGSN 228 may perform inter-EPC node signaling for mobility between different RAT networks; PDN and S-GW selection as specified by MME 224; MME selection for handovers; etc. The S3 reference point between the MME 224 and the SGSN 228 may enable user and bearer information exchange for inter-3GPP access network mobility in idle/active states.

The HSS 230 may include a database for network users, including subscription-related information to support the network entities' handling of communication sessions. The HSS 230 can provide support for routing/roaming, authentication, authorization, naming/addressing resolution, location dependencies, etc. An S6a reference point between the HSS 230 and the MME 224 may enable the transfer of subscription and authentication data for authenticating/authorizing user access to the LTE CN 220.

The PGW 232 may terminate an SGi interface toward a data network (DN) 236 that may include an application/content server 238. The PGW 232 may route data packets between the LTE CN 222 and the data network 236. The PGW 232 may be coupled with the SGW 226 by an S5 reference point to facilitate user plane tunneling and tunnel management. The PGW 232 may further include a node for policy enforcement and charging data collection (for example, PCEF). Additionally, the SGi reference point between the PGW 232 and the data network 236 may be an operator external public, a private PDN, or an intra-operator packet data network, for example, for provision of IMS services. The PGW 232 may be coupled with a PCRF 234 via a Gx reference point.

The PCRF 234 is the policy and charging control element of the LTE CN 222. The PCRF 234 may be communicatively coupled to the app/content server 238 to determine appropriate QoS and charging parameters for service flows. The PCRF 232 may provision associated rules into a PCEF (via Gx reference point) with appropriate TFT and QCI.

In some embodiments, the CN 220 may be a 5GC 240. The 5GC 240 may include an AUSF 242, AMF 244, SMF 246, UPF 248, NSSF 250, NEF 252, NRF 254, PCF 256, UDM 258, and AF 260 coupled with one another over interfaces (or "reference points") as shown. Functions of the elements of the 5GC 240 may be briefly introduced as follows.

The AUSF 242 may store data for authentication of UE 202 and handle authentication-related functionality. The AUSF 242 may facilitate a common authentication framework for various access types. In addition to communicating with other elements of the 5GC 240 over reference points as shown, the AUSF 242 may exhibit a Nausf service-based interface.

The AMF 244 may allow other functions of the 5GC 240 to communicate with the UE 202 and the RAN 204 and to subscribe to notifications about mobility events with respect to the UE 202. The AMF 244 may be responsible for registration management (for example, for registering UE 202), connection management, reachability management, mobility management, lawful interception of AMF-related events, and access authentication and authorization. The AMF 244 may provide transport for SM messages between the UE 202 and the SMF 246, and act as a transparent proxy for routing SM messages. AMF 244 may also provide transport for SMS messages between UE 202 and an SMSF. AMF 244 may interact with the AUSF 242 and the UE 202 to perform various security anchor and context management functions. Furthermore, AMF 244 may be a termination point of a RAN CP interface, which may include or be an N2 reference point between the RAN 204 and the AMF 244; and the AMF 244 may be a termination point of NAS (N1) signaling, and perform NAS ciphering and integrity protection. AMF 244 may also support NAS signaling with the UE 202 over an N3 IWF interface.

The SMF 246 may be responsible for SM (for example, session establishment, tunnel management between UPF 248 and AN 208); UE IP address allocation and management (including optional authorization); selection and control of UP function; configuring traffic steering at UPF 248 to route traffic to proper destination; termination of interfaces toward policy control functions; controlling part of policy enforcement, charging, and QoS; lawful intercept (for SM events and interface to LI system); termination of SM parts of NAS messages; downlink data notification; initiating AN specific SM information, sent via AMF 244 over N2 to AN 208; and determining SSC mode of a session. SM may refer to the management of a PDU session, and a PDU session or "session" may refer to a PDU connectivity service that provides or enables the exchange of PDUs between the UE 202 and the data network 236.

The UPF 248 may act as an anchor point for intra-RAT and inter-RAT mobility, an external PDU session point of interconnecting to data network 236, and a branching point to support multi-homed PDU sessions. The UPF 248 may also perform packet routing and forwarding, perform packet inspection, enforce the user plane part of policy rules, lawfully intercept packets (UP collection), perform traffic usage reporting, perform QoS handling for a user plane (e.g., packet filtering, gating, UL/DL rate enforcement), perform uplink traffic verification (e.g., SDF-to-QoS flow mapping), transport level packet marking in the uplink and downlink, and perform downlink packet buffering and downlink data notification triggering. UPF 248 may include an uplink classifier to support routing traffic flows to a data network.

The NSSF 250 may select a set of network slice instances serving the UE 202. The NSSF 250 may also determine allowed NSSAI and the mapping to the subscribed S-NS-SAIs if needed. The NSSF 250 may also determine the AMF set to be used to serve the UE 202, or a list of candidate AMFs based on a suitable configuration and possibly by querying the NRF 254. The selection of a set of network slice instances for the UE 202 may be triggered by the AMF 244 with which the UE 202 is registered by interacting with the NSSF 250, which may lead to a change of AMF. The NSSF 250 may interact with the AMF 244 via an N22 reference point; and may communicate with another NSSF in a visited network via an N31 reference point (not shown). Additionally, the NSSF 250 may exhibit an Nnssf service-based interface.

The NEF 252 may securely expose services and capabilities provided by 3GPP network functions for the third party, internal exposure/re-exposure, AFs (e.g., AF 260), edge computing or fog computing systems, etc. In such embodiments, the NEF 252 may authenticate, authorize, or throttle the AFs. NEF 252 may also translate information exchanged with the AF 260 and information exchanged with internal network functions. For example, the NEF 252 may translate between an AF-Service-Identifier and an internal 5GC information. NEF 252 may also receive information from other NFs based on the exposed capabilities of other NFs. This information may be stored at the NEF 252 as structured data, or a data storage NF using standardized interfaces. The stored information can then be re-exposed by the NEF 252 to other NFs and AFs, or used for other purposes such as analytics. Additionally, the NEF 252 may exhibit a Nnef service-based interface.

The NRF 254 may support service discovery functions, receive NF discovery requests from NF instances, and provide the information of the discovered NF instances to the NF instances. NRF 254 also maintains information on available NF instances and their supported services. As used herein, the terms "instantiate," "instantiation," and the like may refer to the creation of an instance, and an "instance" may refer to a concrete occurrence of an object, which may occur, for example, during the execution of program code. Additionally, the NRF 254 may exhibit the Nnrf service-based interface.

The PCF 256 may provide policy rules to control plane functions to enforce them, and may also support a unified policy framework to govern network behavior. The PCF 256 may also implement a front end to access subscription information relevant for policy decisions in a UDR of the UDM 258. In addition to communicating with functions over reference points as shown, the PCF 256 exhibits an Npcf service-based interface.

The UDM 258 may handle subscription-related information to support the network entities' handling of communication sessions and may store the subscription data of UE 202. For example, subscription data may be communicated via an N8 reference point between the UDM 258 and the AMF 244. The UDM 258 may include two parts, an application front end, and a UDR. The UDR may store subscription data and policy data for the UDM 258 and the PCF 256, and/or structured data for exposure and application data (including PFDs for application detection, application request information for multiple UEs 202) for the NEF 252. The Nudr service-based interface may be exhibited by the UDR 221 to allow the UDM 258, PCF 256, and NEF 252 to access a particular set of the stored data, as well as to read, update (e.g., add, modify), delete, and subscribe to the notification of relevant data changes in the UDR. The UDM may include a UDM-FE, which is in charge of processing credentials, location management, subscription management, and so on. Several different front ends may serve the same user in different transactions. The UDM-FE accesses subscription information stored in the UDR and performs authentication credential processing, user identification handling, access authorization, registration/mobility management, and subscription management. In addition to communicating with other NFs over reference points as shown, the UDM 258 may exhibit the Nudm service-based interface.

The AF 260 may provide application influence on traffic routing, provide access to NEF, and interact with the policy framework for policy control.

In some embodiments, the 5GC 240 may enable edge computing by selecting operator/3rd party services to be geographically close to a point that the UE 202 is attached to the network. This may reduce latency and load on the network. To provide edge-computing implementations, the 5GC 240 may select a UPF 248 close to the UE 202 and execute traffic steering from the UPF 248 to data network 236 via the N6 interface. This may be based on the UE subscription data, UE location, and information provided by the AF 260. In this way, the AF 260 may influence UPF (re)selection and traffic routing. Based on operator deployment, when AF 260 is considered to be a trusted entity, the network operator may permit AF 260 to interact directly with relevant NFs. Additionally, the AF 260 may exhibit a Naf service-based interface.

The data network 236 may represent various network operator services, Internet access, or third-party services that may be provided by one or more servers including, for example, application/content server 238.

FIG. 3 schematically illustrates a wireless network 300 in accordance with various embodiments. The wireless network 300 may include a UE 302 in wireless communication with AN 304. The UE 302 and AN 304 may be similar to, and substantially interchangeable with, like-named components described elsewhere herein.

The UE 302 may be communicatively coupled with the AN 304 via connection 306. The connection 306 is illustrated as an air interface to enable communicative coupling and can be consistent with cellular communications protocols such as an LTE protocol or a 5G NR protocol operating at mmWave or sub-6 GHz frequencies.

The UE 302 may include a host platform 308 coupled with a modem platform 310. The host platform 308 may include application processing circuitry 312, which may be coupled with protocol processing circuitry 314 of the modem platform 310. The application processing circuitry 312 may run various applications for the UE 302 that source/sink application data. The application processing circuitry 312 may further implement one or more layer operations to transmit/receive application data to/from a data network. These layer operations may include transport (for example UDP) and Internet (for example, IP) operations The protocol processing circuitry 314 may implement one or more layer operations to facilitate transmission or reception of data over the connection 306. The layer operations implemented by the protocol processing circuitry 314 may include, for example, MAC, RLC, PDCP, RRC, and NAS operations.

The modem platform 310 may further include digital baseband circuitry 316 that may implement one or more layer operations that are "below" layer operations performed by the protocol processing circuitry 314 in a network protocol stack. These operations may include, for example, PHY operations including one or more of HARQ-ACK functions, scrambling/descrambling, encoding/decoding, layer mapping/de-mapping, modulation symbol mapping, received symbol/bit metric determination, multi-antenna port precoding/decoding, which may include one or more of space-time, space-frequency or spatial coding, reference signal generation/detection, preamble sequence generation and/or decoding, synchronization sequence generation/detection, control channel signal blind decoding, and other related functions.

The modem platform 310 may further include transmit circuitry 318, receive circuitry 320, RF circuitry 322, and RF front end (RFFE) 324, which may include or connect to one or more antenna panels 326. Briefly, the transmit circuitry 318 may include a digital-to-analog converter, mixer, intermediate frequency (IF) components, etc.; the receive circuitry 320 may include an analog-to-digital converter, mixer, IF components, etc.; the RF circuitry 322 may include a low-noise amplifier, a power amplifier, power tracking components, etc.; RFFE 324 may include filters (for example, surface/bulk acoustic wave filters), switches, antenna tuners, beamforming components (for example, phase-array antenna components), etc. The selection and arrangement of the components of the transmit circuitry 318, receive circuitry 320, RF circuitry 322, RFFE 324, and antenna panels 326 (referred generically as "transmit/receive components") may be specific to details of a specific implementation such as, for example, whether the communication is TDM or FDM, in mm Wave or sub-6 GHz frequencies, etc. In some embodiments, the transmit/receive components may be arranged in multiple parallel transmit/receive chains, may be disposed of in the same or different chips/modules, etc.

In some embodiments, the protocol processing circuitry 314 may include one or more instances of control circuitry (not shown) to provide control functions for the transmit/receive components.

A UE reception may be established by and via the antenna panels 326, RFFE 324, RF circuitry 322, receive circuitry 320, digital baseband circuitry 316, and protocol processing circuitry 314. In some embodiments, the antenna panels 326 may receive a transmission from the AN 304 by receive-beamforming signals received by a plurality of antennas/antenna elements of the one or more antenna panels 326.

A UE transmission may be established by and via the protocol processing circuitry 314, digital baseband circuitry 316, transmit circuitry 318, RF circuitry 322, RFFE 324, and antenna panels 326. In some embodiments, the transmit components of the UE 302 may apply a spatial filter to the data to be transmitted to form a transmit beam emitted by the antenna elements of the antenna panels 326.

Similar to the UE 302, the AN 304 may include a host platform 328 coupled with a modem platform 330. The host platform 328 may include application processing circuitry 332 coupled with protocol processing circuitry 334 of the modem platform 330. The modem platform may further include digital baseband circuitry 336, transmit circuitry 338, receive circuitry 340, RF circuitry 342, RFFE circuitry 344, and antenna panels 346. The components of the AN 304 may be similar to and substantially interchangeable with like-named components of the UE 302. In addition to performing data transmission/reception as described above, the components of the AN 304 may perform various logical functions that include, for example, RNC functions such as radio bearer management, uplink and downlink dynamic radio resource management, and data packet scheduling.

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440 or other interface circuitry. For embodiments where node virtualization (e.g., NFV) is utilized, a hypervisor 402 may be executed to provide an execution environment for one or more network slices/sub-slices to utilize the hardware resources 400.

The processors 410 may include, for example, a processor 412 and a processor 414. The processors 410 may be, for example, a central processing unit (CPU), a reduced instruction set computing (RISC) processor, a complex instruction set computing (CISC) processor, a graphics processing unit (GPU), a DSP such as a baseband processor, an ASIC, an FPGA, a radio-frequency integrated circuit (RFIC), another processor (including those discussed herein), or any suitable combination thereof.

The memory/storage devices 420 may include a main memory, disk storage, or any suitable combination thereof. The memory/storage devices 420 may include but are not limited to, any type of volatile, non-volatile, or semi-volatile memory such as dynamic random access memory (DRAM), static random access memory (SRAM), erasable programmable read-only memory (EPROM), electrically erasable programmable read-only memory (EEPROM), Flash memory, solid-state storage, etc.

The communication resources 430 may include interconnection or network interface controllers, components, or other suitable devices to communicate with one or more peripheral devices 404 or one or more databases 406 or other network elements via a network 408. For example, the communication resources 430 may include wired communication components (e.g., for coupling via USB, Ethernet, etc.), cellular communication components, NFC components, Bluetooth® (or Bluetooth® Low Energy) components, Wi-Fi® components, and other communication components.

Instructions 450 may comprise software, a program, an application, an applet, an app, or other executable code for causing at least any of the processors 410 to perform any one or more of the methodologies discussed herein. The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media.

For one or more embodiments, at least one of the components outlined in one or more of the preceding figures may be configured to perform one or more operations, techniques, processes, and/or methods as outlined in the example sections below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The term "application" may refer to a complete and deployable package, environment to achieve a certain function in an operational environment. The term "AI/ML application" or the like may be an application that contains some artificial intelligence (AI)/machine learning (ML) models and application-level descriptions. In some embodiments, an AI/ML application may be used for configuring or implementing one or more of the disclosed aspects.

The term "machine learning" or "ML" refers to the use of computer systems implementing algorithms and/or statistical models to perform a specific task(s) without using explicit instructions but instead relying on patterns and inferences. ML algorithms build or estimate mathematical model(s) (referred to as "ML models" or the like) based on sample data (referred to as "training data," "model training information," or the like) to make predictions or decisions without being explicitly programmed to perform such tasks. Generally, an ML algorithm is a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the present disclosure.

The term "machine learning model," "ML model," or the like may also refer to ML methods and concepts used by an ML-assisted solution. An "ML-assisted solution" is a solution that addresses a specific use case using ML algorithms during operation. ML models include supervised learning (e.g., linear regression, k-nearest neighbor (KNN), decision tree algorithms, support machine vectors, Bayesian algorithm, ensemble algorithms, etc.) unsupervised learning (e.g., K-means clustering, principle component analysis (PCA), etc.), reinforcement learning (e.g., Q-learning, multi-armed bandit learning, deep RL, etc.), neural networks, and the like. Depending on the implementation a specific ML model could have many sub-models as components and the ML model may train all sub-models together. Separately trained ML models can also be chained together in an ML pipeline during inference. An "ML pipeline" is a set of functionalities, functions, or functional entities specific for an ML-assisted solution; an ML pipeline may include one or several data sources in a data pipeline, a model training pipeline, a model evaluation pipeline, and an actor. The "actor" is an entity that hosts an ML-assisted solution using the output of the ML model inference). The term "ML training host" refers to an entity, such as a network function, that hosts the training of the model. The term "ML inference host" refers to an entity, such as a network function, that hosts the model during inference mode (which includes both the model execution as well as any online learning if applicable). The ML-host informs the actor about the output of the ML algorithm, and the actor decides for an action (an "action" is performed by an actor as a result of the output of an ML-assisted solution). The term "model inference information" refers to information used as an input to the ML model for determining inference(s); the data used to train an ML model and the data used to determine inferences may overlap, however, "training data" and "inference data" refer to different concepts.

A UE generally needs to transition into RRC_CONNECTED to send any UL data. In some aspects, a UE can send a single packet/PDU while UE is in RRC_IDLE with suspend indication or in RRC_IDLE. However, there is no mechanism defined in 3GPP standard specifications for a UE in RRC_INACTIVE to exchange multiple packets/PDUs of data (i.e., without having to always transition the UE into RRC_CONNECTED).

Some UL data communication techniques include the following.

(a) Rel-15 Early Data Transmission (EDT) defined for LTE eMTC and NB-IoT. This technique allows one UL data transmission optionally followed by one DL data transmission during the random access procedure. The S1 connection is established or resumed upon reception of the UL data and may be released or suspended along with the transmission of the DL data. EDT refers to both CP-EDT and UP-EDT (with UP-EDT being relevant for Rel-17 NR SDT WI). Rel-15 EDT mechanism is specified as part of TS 36.300 and TS 36.331.

(b) Rel-16 Preconfigured Uplink Resource (PUR) defined for LTE eMTC and NB-IoT. Transmission using PUR allows one UL data transmission using a preconfigured uplink resource from RRC_IDLE mode. Transmission using PUR refers to both CP transmission using PUR and UP transmission using PUR (with UP transmission using PUT being relevant for Rel-17 NR SDT WI). Rel-16 PUR mechanism is specified as part of TS 36.300, 36.321, and 36.331.

(c) SDT discussion during Rel-14 NR SI. Annex G of TR 38.804 includes a high-level description of a mechanism to enable small UL data transmission in RRC_INACTIVE (which refers to a feature where a UE in RRC_INACTIVE can transmit small UL data without necessarily performing a full state transition to RRC_CONNECTED).

(d) NR small data transmissions (SDT) in RRC_INACTIVE (e.g., using the disclosed techniques). Justification of Rel-17 SDT in RRC_INACTIVE WI: Reduction of signaling overhead and power consumption for small and infrequent data traffic, for smartphone applications (e.g. IM, keep alive, push of notifications) and non-smartphone applications (e.g., wearables, sensors, smart meters).

In some embodiments, UL small data transmissions for RACH-based schemes (i.e., 2-step and 4-step RACH) may be configured using the disclosed techniques. Procedure to enable UP data transmission for small data packets from the INACTIVE state (e.g., using MSGA or MSG3). Enable flexible payload sizes larger than the Rel-16 CCCH message size that is possible currently for INACTIVE state for MSGA and MSG3 (actual payload size can be up to network configuration). Context fetch and data forwarding (with and without anchor relocation) in an INACTIVE state may be used for RACH-based solutions.

In some embodiments, the transmission of UL data on pre-configured PUSCH resources (i.e., reusing the configured grant type 1) may be used (when TA is valid), including a general procedure for small data transmission over configured grant type 1 resources from INACTIVE state, and configuration of the configured grant type 1 resources for small data transmission in UL for INACTIVE state.

However, some solutions explained above do not allow the transmission of multiple packets/PDUs while UE is in RRC_INACTIVE.

The disclosed techniques provide a solution, with security details, to prevent data loss in case of failures during SDT based on providing a new security key after failure to avoid the security risk of using an old key. The disclosed techniques provide a solution for security for RRC-less SDT transfer using configured grants by modeling it as in connected mode. The disclosed techniques also provide a solution to continue robust header compression (RoHC) across SDT sessions by the network providing in advance an indication on whether to continue RoHC and a region in which this indication is valid.

The proposed solutions also provide a secure mechanism that can be used after a failure during an SDT session that prevents data loss or duplication. The solution for RoHC continuation allows the continued use of RoHC state and avoids the need for transfer of full IP header. Both solutions provide more efficient and optimal transfer of SDT data.

The following principles summarize aspects to apply to the techniques described herein:

(a) The figures or mechanism may assume a 4-step based RACH, however, they may be equally applicable to 2-step based RACH. When the SDT to transmit may require multiple packets/PDUs (i.e. N>1), 2-step RACH will know it already before doing its 1st transmission as UE is aware of the TBS allowed for the MsgA. Therefore, a UE knows whether it will need N>1 when it generates the 1st RRC message (i.e., RRCResumeRequest like), and hence the UE can include in its 1st SDT if it requires N>1 (e.g., via that or other RRC message or by multiplexing a BSR or other form of indication). Whereas the difference for 4-step RACH, will depend on the UL grant size indicated to the UE by the gNB via the RAR.

(b) The figures or mechanism may assume that a UL SDT is firstly triggered, however, the techniques may be equally applicable when DL SDT triggers the initiation.

(c) The new mechanisms described here aim to enable subsequent N transmissions of UL SDT and M transmissions of DL SDT while keeping UE in INACTIVE, with N and M could be any integer number greater or equal to 0, although for simplicity the solutions may focus N and M equal to 2.

(d) The UL or DL SDT refers to both data or signaling (including e.g. MAC CEs or RRC messages) that are exchanged between the UE and network. Therefore, the SDT mechanism assumes that it is possible to multiplex any signaling (sent over SRB0, SRB1, or SRB2) and/or data (sent over any DRB).

(e) The figures or mechanism may assume that the UE AS context is successfully relocated to the new gNB, however, they may be equally applicable when the UE AS context does not need to be relocated. Moreover, in some cases, the interactions with previous gNB and AMF may not be shown for simplicity to focus on the radio interface aspects.

(f) The new mechanisms described here focus on allowing SDT while UE is in RRC_INACTIVE, however it should be possible at any time for the UE to transition into RRC_CONNECTED when falling back to resume an RRC connection and to establish a new RRC connection.

(g) The disclosed techniques assume that RRC signaling (e.g. RRCResumeRequest and RRCRelease) is involved when exchanging the SDT, however similar operation could also be enabled without this RRC signaling, such as, when UE is accessing in the cell where the UE AS Context was stored (which here is referred as "last gNB" but may also be referred as "anchor gNB").

(h) The UL/DL SDT belongs to a single radio bearer (RB), e.g., SRB1(for NAS PDU) or DRB (for data PDU) that was already established (when the UE was previously RRC_CONNECTED) and is suspended while the UE is in RRC_INACTIVE.

(i) The solutions defined here are also applicable to small data exchange handling by a UE in RRC_INACTIVE associated with a CU-DU architecture, as well as the mechanism for enabling multiple UL and DL Small Data Transmission (SDT) using pre-configured UL resources (PUR) while in INACTIVE).

Figure 5:
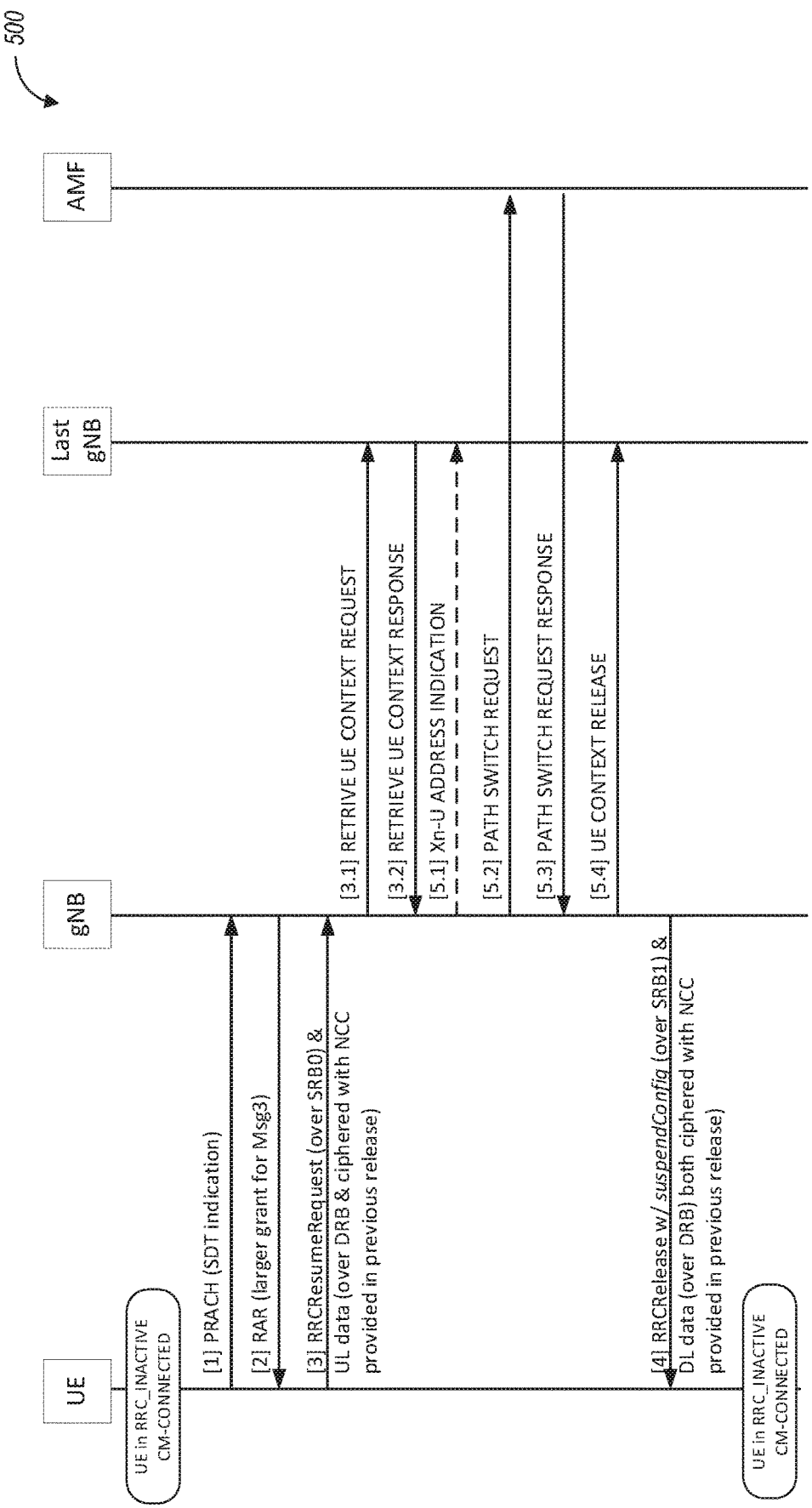
FIG. 5 illustrates a UL SDT followed by an optional DL SDT by a UE in RRC_Inactive state, according to some example embodiments.

FIG. 5 illustrates a diagram 500 of UL SDT followed by optional DL SDT by a UE in RRC_Inactive state, according to some example embodiments.

The details on the steps of the scenario shown in FIG. 5 are described as follow:

(a) Step 1) The UE should be able to indicate the network when it desires to exchange SDT, for example, by using different RACH preambles and/or RACH resources (in time and/or frequency).

(b) Step 2) The network should be able to indicate to the UE whether the SDT is accepted with the corresponding TBS size granted for its following UL SDT. This may be done by extending legacy RAR (e.g. by using one of the reserved bits to indicate the acceptance of SDT, as it was done for LTE EDT) or by other means, such as defining a new RAR like message for SDT.

(c) Step 3) An RRC message (like for example RRCResumeRequest) is sent by UE over SRB0 without being ciphered or with integrity protection including at least the UE ID (e.g. resume ID), MAC-I, and potentially cause value. This RRC message could be multiplexed with another signaling (sent over SRB1/2) or data (sent over DRB) that may be sent but ciphered and integrity protected with the security keys generated by the next-hop chaining count (NCC) provided in a previous RRCRelease message. The security needs to be established before decoding that UL data or signaling.

When required, the gNB retrieves the UE AS context from the gNB where it was stored (referred to in FIG. 5 as "last gNB").

(d) Step 4) When UL SDT is successful and the RRC connection does not need to be resumed, an RRC message (like for example RRCRelease) is sent by gNB to the UE ciphered and integrity protected over SRB1 to keep the UE in RRC_INACTIVE while providing updated information, such as, suspendConfig (which contains, amongst others, a new nextHopChaining-Count (NCC), provided to be used in future, e.g., when doing SDT or when resuming). This RRC message could be multiplexed with other signaling or data that may be sent (where all of them would also be ciphered and integrity protected with the security keys generated by the NCC provided in a previous RRCRelease message).

Figure 6:
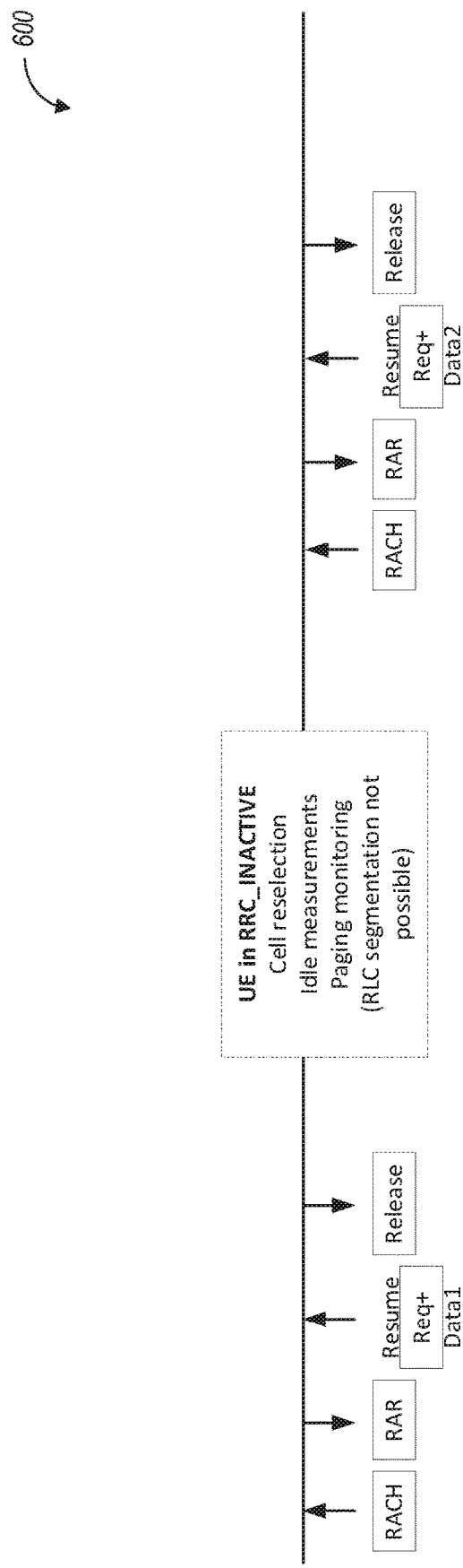
FIG. 6 illustrates UE key-related operations to send two UL data packets, according to some embodiments.

FIG. 6 illustrates a diagram 600 of UE key-related operations to send two UL data packets, according to some embodiments.

When more than one UL(/DL) SDT needs to be exchanged, they would be treated as subsequent independent transmissions. For example, FIG. 6 shows the expected operation to send two UL data packets via the mechanism depicted in scenario (0-A). In some aspects, this approach would not allow segmentation (as the RLC will be re-established when UE receives the RRC release), and UE would need to do a random access channel (RACH) procedure for each data packet transmission (as independent SDT access). Alternatively, the UE could send BSR like indication in the 1st SDT multiplexed with RRCResumeRequest (or any RRC message used to initiate the EDT) and part of the data (which is now segmented). This would make the network realize that the UE requires to be moved into RRC_CONNECTED to transmit the follow-up data (in which case the gNB would trigger the fallback mechanism to resume the connection, as it is explained in scenario (0-B) below).

Table 1 below summarizes the operational details that describe UL SDT followed by optional DL SDT by a UE in RRC_INACTIVE. Table 1 depicts new information or mechanisms not defined in Rel-15/16 NR (even though are aligned to the ones defined in Rel-15/16 LTE) that are required.

TABLE 1

| Topics | Scenario (0-A): UL/DL SDT by a UE in RRC_INACTIVE |
|---|---|
| Msg1 (PRACH) | The network can differentiate RACH access for SDT |
| Msg2 (RAR) | Network notifies the UE of a larger UL grant or the usage of for Msg.3 |
| Msg3 | RRCResumeRequest like (sent over SRB0) and UL data (sent over DRB) are multiplexed. Potentially another signaling (sent over SRB1 or even SRB2) may also be multiplexed |
| Msg4 | Release event (*1) |
| Msg5 | N/A |
| N UL SDT and N DL SDT | 1 UL (and optional 1 DL) SDT |
| RLC entity used for multiple SDT | N/A |
| Release event (*1) | Step done as Msg4 (*1) RRCRelease like (sent over SRB1) and optionally another signaling (sent over SRB1 or even SRB2) and/or DL data (sent over DRB) may be multiplexed. |
| Reconfiguration | Limited via RRCRelease |
| PDCCH monitoring | Continuously |
| Cell reselection | Applicable like for a legacy UE in RRC_INACTIVE |
| Measurements | Applicable like for a legacy UE in RRC_INACTIVE |
| Measurement reporting | N/A |
| RNAU (periodic or not) | Applicable like for a legacy UE in RRC_INACTIVE |
| Short msg monitoring for SI notification | Applicable like for a legacy UE in RRC_INACTIVE |
| Mobility handling | Failure of SDT (where its handling could be left up to UE implementation) |
| BSR like | N/A |
| Paging monitoring | Applicable like for a legacy UE in RRC_INACTIVE |
| Handling of coverage loss | Failure of SDT (where its handling could be left up to UE imple- |

TABLE 1-continued

| Topics | Scenario (0-A): UL/DL SDT by a UE in RRC_INACTIVE |
|---|---|
| | mentation) |
| Updated NCC | NCC is updated upon reception of RRCRelease |
| NW trigger fallback to resume | Allowed |
| NW trigger fallback to the establishment | Allowed |
| Segmentation | Not allowed |
| UL or DL signaling | Limited to the signaling associated with the resume/suspend procedures including fallback operation into RRC_CONNECTED |

In some aspects, the SDT mechanism may need to be aborted (in which case UE may move back into RRC_INACTIVE or RRC_IDLE depending on the case) or fallback (in which case UE may resume an RRC connection or establish a new RRC connection leading the UE into RRC_CONNECTED) during the procedure. The following are some of the possible cases that may be used with the disclosed techniques:

(a) Case 1) After sending SDT Msg.1, UE receives a RAR like in Msg2 that triggers UE to fall back to legacy operation (being up to UE if/whether to send RRCResumeRequest or RRCSetupRequest).

(b) Case 2) After sending SDT Msg.1, UE needs to re-send Msg.1 (up to UE whether to send SDT Msg.1 or legacy Msg1). Possible reasons: (i) UE does not receive RA response within the RAR window and SDT conditions are not met, (ii) if, during the RACH process and retries, the total MAC PDU for Msg3 cannot fit in the maximum TBS size allowed for Msg.3 (e.g., for the case when the max TBS may change while future retries during the RACH process).

(c) Case 3) After sending SDT Msg.3, the UE receives Msg.4 as RRCResume (aiming to resume the suspended connection and transition the UE into RRC_CONNECTED). The UL data multiplexed in Msg.3 is considered successful.

(d) Case 4) After sending SDT Msg.3, the UE receives Msg.4 as RRCSetup (aiming to establish a new connection and transition the UE into RRC_CONNECTED). UL data multiplexed in Msg.3 is considered a failure.

(e) Case 5) SDT mechanism may be aborted upon (5. a) T300 expires, (5. b) Cell reselection while T300 is running, (5. c) UE receives RRCReject message in Msg4, (5. d) Integrity protection check of RRC message in Msg4 fails.

In some aspects, the UL SDT may not be considered successful if the UE does not get the expected DL confirmation, e.g., RRCRelease or, in case of resumption, RRCResume. In aspects when the network triggers a fallback to establish a new RRC connection (via RRCSetup), UL SDT may not be considered successful (e.g., as gNB would not have the security information and/or UE AS context information required to decode it).

Figure 7:
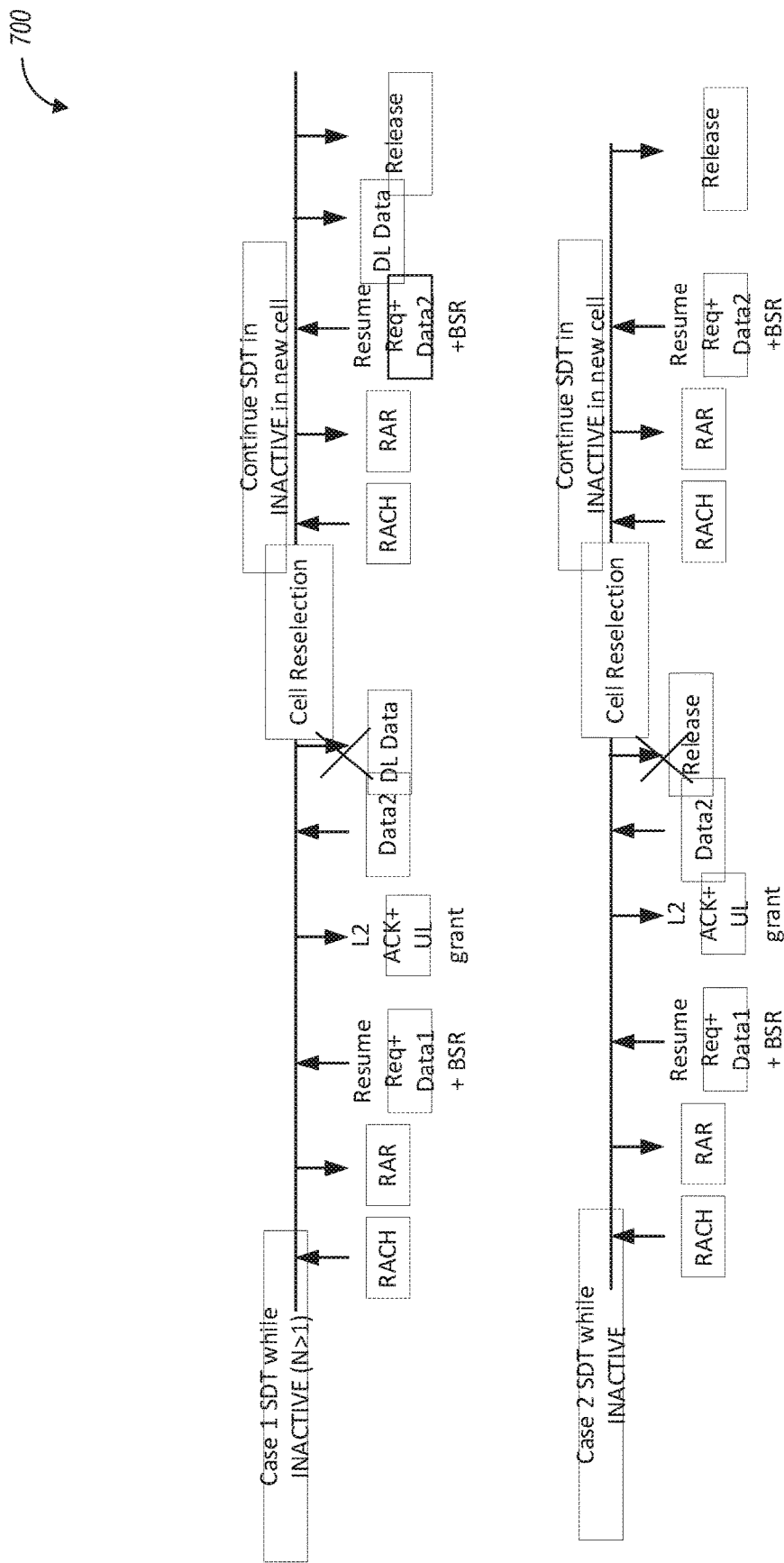
FIG. 7 illustrates cell reselection during SDT while the UE is in the RRC_Inactive state, according to some embodiments.

FIG. 7 illustrates diagram 700 of cell reselection during SDT while the UE is in RRC_Inactive state, according to some embodiments.

SDT can be expected to introduce new procedures or changes to the procedure that requires different security handling to normal INACTIVE procedures that impact both the control plane and user plane. The disclosed techniques include the security aspects for the different scenarios.

Security handling for the control plane for SDT may need changes to the existing procedures for INACTIVE, such as handling of security keys. For the user plane, the application of the new keys and corresponding re-establishment of the PDCP is described herein.

Failure procedures, such as cell reselection during SDT, may be included in the disclosed techniques. It was agreed that UE and network may transfer more than one data packet in the UL and DL during an SDT session. This can be useful as the size of a data field in msg 3 can be limited. It also allows the data to be segmented and sent over multiple TBs if the PDCP SDU size is too large to fit in one TB.

This then also increases the overall duration of an SDT session. A consequence of this is that it increases the possibility of cell reselection during an SDT session as shown in FIG. 7.

The current behavior on cell reselection between an RRC Resume Request and Resume message (T319) is for UE to go to RRC IDLE.

In some embodiments, a timer, for example, T319' can be used to check for failures. The timer is started with the start of SDT transfer, such as sending a Resume Request for SDT. The timer is stopped on receiving some confirmation or completion of the transfer; this could be, for example, an RRC Resume or RRC release. Cell reselection during SDT can be identified as cell reselection while T319' is running. After cell reselection, T319' is stopped. A new SDT session can be restarted after completion of cell reselection and UE starts a new SDT session with RACH and T319' is re-started again.

On transitioning to IDLE, the network UE context in gNB is released and any DL data in the gNB is also cleared. If the UE is allowed to go IDLE during an SDT transfer, this data could be lost in the DL without any possibility of recovery or retransmission.

In one embodiment, DL data loss is prevented when UE goes to Idle state (e.g., RRC_Idle) but by RAN node sending the data back to the CN (e.g. AMF or UPF) to allow CN to re-send the data to the new RAN node when the UE performs NAS recovery in another cell.

After cell reselection, to prevent UL data loss, the UE could repeat data PDCP SDUs in the UL that have not been acknowledged. However, the network may have already received the data but the acknowledgment was not received by the UE. If the PDCP SN for the data is not maintained in the network and UE for the repeated data (such as when UE goes to IDLE), this may result in duplication of the data.

UE is also likely to perform many SDT transfers. If the UE goes to IDLE during this cell reselection, data could be lost or duplicated and this could happen frequently.

To avoid such data loss or duplication, the UE may continue in INACTIVE after cell reselection such that the UE context and data are not cleared by the gNB, and also the PDCP SNs are maintained in the UE and the network.

Depending on when the cell reselection happened, the UE may or may not have received the RRC release with the new NCC before the cell reselection. The network cannot be certain that the UE has received the RRC release with NCC even if it did send it. As there are no measurements from the UEs, the possibility of failure of the RRC message is more likely with SDT than when the UE was RRC CONNECTED.

To handle this uncertainty of the value of the NCC in the UE, when the network could try out the old and the new key values to check if the short MAC-I generated with either match the one provided in the Resume Request and pick the one that matches. The network may subsequently provide the UE with a new NCC to re-sync the network and UE with a new key as discussed above.

The UE may not have received the RRC release message with the new NCC during the SDT session. In the absence of a new NCC to generate a new key for the next SDT session, there is a possibility of security risk from re-using the old key.

For INACTIVE, new NCC is provided in RRC Release message and used by the UE for SRBs and DRBs except Resume Request is sent over SRB0 with short MAC-I calculated using the old NCC. Although the use of new NCC may not be essential for all new SDT sessions, this INACTIVE mechanism can be re-used for RRC based SDT, both with and without anchor relocation, as it ensures the principle that a security key is not re-used in different nodes.

As discussed above, data loss may occur if the UE goes to Idle, for example after cell reselection, during SDT transfer and UE has to continue in an INACTIVE state to avoid data loss. Security during the new Resume Request in a new cell may use the following additional consideration as new NCC may not be provided to the UE before the cell reselection.

(a) Provide NCC to minimize the possibility of UE not having a new NCC for access in the new cell. While it is not possible to ensure that UE will not have done cell reselection before it can receive this if this period can be kept small, the possibility of it happening will be low and it might be acceptable for UE to go to Idle with occasional data loss should it happen.

(b) Network procedure to address the security concern. Networks can address the potential security risk of resending the Resume Request with the old key by using fallback to the regular Resume procedure.

(b.1) UE resumes in the same CU: In this case, the same key can be used to send RRC messages to the UE. One possibility is for the network to send an RRC release with a new NCC immediately in response to the Resume request. Alternatively, it triggers a fallback to the regular resume and moves UE to connected. The exchange of Resume and Resume complete will provide mutual authentication. The network can then immediately provide a new NCC to move the UE to INACTIVE. The UE can then immediately trigger another resume request with the new keys for the transfer of any user data.

(b.2) UE resumes in another CU: In this case, the same procedure as above (for the same CU) can be re-used with anchoring the UE context in the last serving gNB-CU.

(c) If anchoring is not possible/chosen, then the UE context may be moved to the new gNB CU and hence new keys have to be used for any RRC messages such as Release/Resume, and hence it is not possible to provide the new NCC. Another embodiment is for the UE to re-use the same NCC but perform a horizontal key derivation. The UE can provide the number of horizontal key derivations it used as an additional synchronization mechanism. The new key could be used for this SDT or simply to provide the new NCC and move the UE back to INACTIVE as discussed above. The network will generate the key based on the horizontal key derivation to match the key used by the UE.

The above embodiments could be used for any failure causes during the SDT session.

In some embodiments, when the UE performs a recovery after a failure in SDT, the UE, and the network can perform retransmission of data that was not previously delivered. This retransmission can occur at any level of the protocol stack depending on the recovery mechanism. If the RLC state machine is stored during the recovery process, the RLC layer can perform re-transmission to recover the data. In another embodiment, the data is retransmitted from above the protocol stack (at SDU level) of SDAP/PDCP. In some aspects, any data that is not acknowledged can be retransmitted. By re-using the same PDCP SN, duplicates can be detected and discarded. This can be done at the network or UE side. An additional indication may be provided from the DU to the CU to indicate which packets were successfully transmitted and which ones should be retransmitted. The network and UE may also take into account the validity of the packet, such as with signaling messages (for example tracking area update) that are not valid in the new cell are discarded and not re-transmitted.

In some embodiments, to handle a combination of UEs supporting SDT and legacy UEs, where the SDT UEs behave differently as in this filing, the network may use the UE capability provided to determine the appropriate behavior. For legacy UEs, the network discards the UE context and move UEs to Idle, while for SDT supporting UEs, the network may consider the UE behavior and not move UEs to Idle.

A related aspect of the disclosed techniques is the re-establishment of the PDCP. PDCP has to be re-established when using a new key and this is normally done in NR using an explicit indication in the RBConfig for each of the RBs. For INACTIVE, the RBConfig with re-establishment flag for the SRBs and DRBs except for SRB1 is carried in the Resume message that is received by the UE before it sends any other signaling/data. For SDT, there is no Resume message exchanged before UE sends SDT and hence this INACTIVE solution is not possible. The following two aspects may be considered:

(a) How to perform PDCP re-establishment; and
(b) Whether to perform PDCP reestablishment for all the RBs, even they have no SDT data.

On how to perform PDCP reestablishment, the following two options may be used:

(a) Send the RBConfig as part of the Release message along with the NCC. This may be re-considered as the UE has to generate the actual keys based on the cell ARFCN which can only be done during SDT and the re-establishment can only be done during SDT.
(b) Implicit re-establishment of the PDCP for the RBs for SDT before sending data. This goes against the principles of NR that reestablishment is based on explicit network indication.

On which RBs perform reestablishment, while it is not essential to re-establish PDCP for RBs that do not have data, it is simpler from the specification point of view to re-establish for all DRBs.

As the UE may not be aware of whether the network will perform anchor relocation at the time it sends the SDT data, the UE behavior has to be the same with and without anchor relocation. If there is anchor relocation, the network has to buffer data until the serving node can retrieve the UE context from the old node. This is so for the RLC bearer configuration and PDCP/SDAP configuration.

The network may decide to relocate or anchor the UE context based on many factors. A reason to anchor is to avoid many network patch switch procedures when UE has high relative mobility compared to SDT frequency. The network can already keep track of this UE mobility versus data pattern and no further information from the UE may be needed.

Another possible network consideration could be if there is more than one packet to be exchanged over an SDT session. Whether there is more than one packet in one SDT session may be available at the serving DU on receipt of msg 3/A, for example from the BSR. The BSR itself may not be useful in deciding whether to anchor or relocate, but a simple indication of "more data" may be sufficient.

The decision to continue to anchor or relocate can be based on multiple factors such as UE mobility pattern, more than one data packet in an SDT session, etc.

The UE may need to know in advance at the time of sending data whether to continue with the RoHC state or not. That is, it would need to know before starting the SDT session whether the network can continue RoHC or whether the context is relocated.

During handover in NR, header compression may be continued during HO based on network indication in the HO command. Typically, it can be continued when the RoHC context is not relocated during the HO and sometimes, depending on implementation, even with RoHC context relocation (though this RoHC context transfer procedure on the network side is not specified).

Following the same logic for SDT, it may be possible to continue RoHC when the SDT session is not relocated. This could be due to resumption in the same CU region or due to anchoring. On the other hand, if the context is relocated it may not be possible for RoHC to continue after relocation. Since the decision of whether to relocate or not is dependent on factors such as a cell in which UE is resuming that network is aware only after the network receives, it is not possible to indicate in advance to the UE whether to continue RoHC or not for SDT.

This means UE has to know in advance of data transfer whether the RoHC header continues or not. Since it may not be possible for the network to transfer the RoHC context from one node to another, it may not be possible for RoHC to continue after relocation. One possibility is to allow RoHC to continue only in the same cell for SDT. Alternatively, it could be allowed to continue RoHC within a certain area-such as within an RNA or a certain group of cells. And this could also be under the control of the network. That is, the network can indicate this to the UE in the RRC release message that was sent to the UE to INACTIVE before the SDT session. In one embodiment, this indication can be, "continue RoHC within the same cell". If the indication is set, the UE may continue RoHC for SDT within the same cell, and if it is not set, the UE may not continue RoHC. For SDT outside the cell, the UE may not continue the RoHC state.

Failure cases, such as cell reselection during SDT transfer could be handled by always resetting the RoHC state.

Expiry of T319' will happen if there is a failure of SDT transfer and no other cell is available for reselection. In this case, the UE can go to RRC Idle and perform NAS recovery.

Security for RRC-Less Operation

The RRC-less operation involves UE directly sending user data, such as Small Data Transfer, without a preceding RRC ResumeRequest message. There may not be an RRC Release message also sent as part of the data transfer and hence no possibility to send an NCC for the UE to derive a new key for the next data session.

When the data transfer continues in the cell where UE was previously communicating and over the grants configured to the UE over RRC signaling can be considered secure without updating the keys. While the UE is in INACTIVE between the data transfer, this is, in many ways, similar to the UE continuing in connected mode and communicating over configured grants.

Another embodiment is to use horizontal key derivation for each data transfer. UE may also include a count of the horizontal key derivation to synchronize the keys on the network and the UE. Yet another embodiment is to send the NCC to the UE using an RRC message such as RRC release even if an RRC Resume request was not used at the beginning of the data transfer.

Another aspect to discuss is the procedures UE performs while performing the SDT transfer. When the UE was moved to INACTIVE, it stores the previous configuration. During the SDT transfer, some of that configuration, such as the UE RB configuration is restored and used as the configuration for the SDT data. The stored configuration may also include many other configurations such as UE measurements. To minimize additional complexity, by default none of the other UE configurations should be restored during the SDT session and UE shall not perform any additional procedures beyond what is required at PHY based on default PHY configuration for the data session such as monitoring PDCCH.

The other UE-stored UE configuration beyond the RB configuration is not restored during the SDT session. The UE may not perform additional procedures during the SDT session.

Handling of Other RBs

While the UE may have data on only one DRB when initiating an SDT session, it does not seem essential to restore the other RBs. If the other RBS is not restored, the new keys are also not applied to these RBs and there is no PDCP re-establishment either. This implies that during a series of data transfers on different DRBs, only the ones that carry data are restored, new keys are applied with PDCP re-establishment while this is skipped for other RBs until there is data to send on these other RBs. Another embodiment is to restore all RBs and apply the new keys with PDCP re-establishment on all RBs even if there is no data to send on these RBs. Either option results in the same externally visible UE behavior. Considering that there is no real difference between either option, and it seems simpler to always have the same handling of all RBs, the second option seems more attractive.

Preventing Data Loss During Fallback

In some embodiments, multiple fallback possibilities may be considered, such as fallback from 4-step RACH to 2-step RACH, fallback to Resume, fallback to Connected, and combinations of these with 4-step to 2-step RACH.

Figure 8:
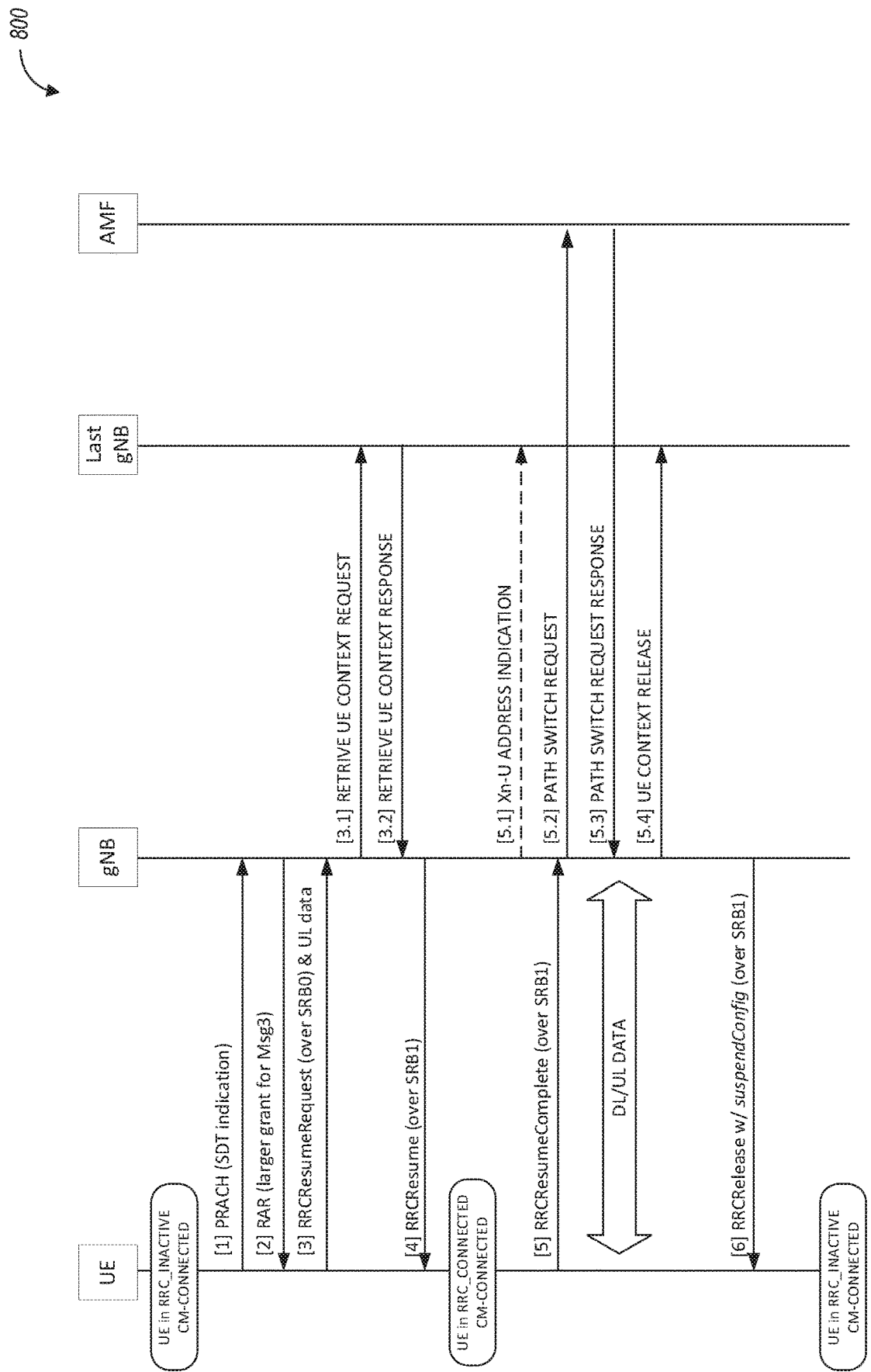
FIG. 8 illustrates an example message flow for a fallback to resume, according to some embodiments.

FIG. 8 illustrates diagram 800 of an example message flow for a fallback to resume, according to some embodiments.

Fallback from 2-step RACH to 4-step RACH may be supported. As this procedure is unchanged from using 2-step RACH for SDT, the fallback from 2-step to 4-step RACH for SDT may continue to be supported.

The gNB may be allowed to trigger the fallback into RRC_CONNECTED by sending RRCResume or RRCSetup messages in Msg4.

During fallback to Resume, the network may successfully process the UL data sent in SDT msg 3/A without loss. When the data carried in msg 3/A is a segment of the PDCP SDU, the network and the UE may maintain the user plane states to be able to continue sending the remaining segments of the data after UE receives the Resume.

In another embodiment, the UE may retransmit the whole PDCP PDU after receiving the RRC resume message. In this case, the RLC can be reset in the network, and the UE after Resume and the retransmission happens at the PDCP layer in the UE.

For a fallback to Setup, the UE may prevent data loss by re-transmitting the data after a new connection setup. In this embodiment, the re-transmission happens at the PDCP SDU level, from above the PDCP. The previous protocol stack is released and a new stack instance is created when the UE receives the Setup message.

In some embodiments, a UE in the RRC_INACTIVE state may transfer small data using SDT procedure, undergoes a link failure in the SDT transfer, and continues to stay in the INACTIVE state after the link failure without transitioning to RRC IDLE state. The UE may use a mechanism to derive new keys for the next session.

In some embodiments, a UE is disclosed herein, where the network provides the parameters to derive the new keys immediately at the start of the SDT session.

In some embodiments, a UE as disclosed herein, where the network provides the UE with the new keys when the UE next resumes with the old keys and moves the UE back to INACTIVE such that the UE can restart data transfer the newly assigned keys in a subsequent SDT session. The UE and the network mutually authenticating itself based on the old keys before accepting the new key.

In some embodiments, a UE and a network as disclosed herein, where the UE context is not relocated during the assignment of the new key even if the UE is in a cell outside the old gNB such that the network can reuse the old key for allocation of the new key.

In some embodiments, a UE as disclosed herein, where the UE performs a horizontal key derivation to use new keys; the UE may provide a count of the horizontal key derivation for the network and UE to synchronize the key to use.

In some embodiments, a UE as disclosed herein, where the UE sends a secure message and the network checks the validity of the message against possible keys to check the authenticity of the UE and the key used by the UE.

In some embodiments, a UE in SDT data transfer, where the UE or network retransmitting packets on recovery or cell reselection with the same sequence numbers as before failure, to avoid packet loss and for duplicate detection; the retransmission occurring at the PDCP SDU level or RLC level; where the validity of the retransmitted message is considered before resending the data.

In some embodiments, a UE in SDT data transfer, where the network indicates in advance at the previous session the UE behavior should be for this data transfer; where the indication can be whether to continue RoHC state, where the indication to continue can be further confined to a region such as one or more cells or RNA; where the indication could be re-establish PDCP.

In some embodiments, a UE in the SDT data transfer without an initial RRC message, uses the same key as previously used, within a certain region, the region being a cell or group of cells or RNA; or using key derived using horizontal key derivation, where the UE may also indicate the horizontal key derivation count to the network.

In some embodiments, a UE in the SDT data transfer is instructed to perform a fallback to Resume or Setup, retransmits the data at PDCP SDU level sent in msg 3/A after Setup or if the Resume resets the RLC, or continues transmission of the next RLC segment of the data packet after Resume if the Resume does not reset the RLC.

Figure 9:
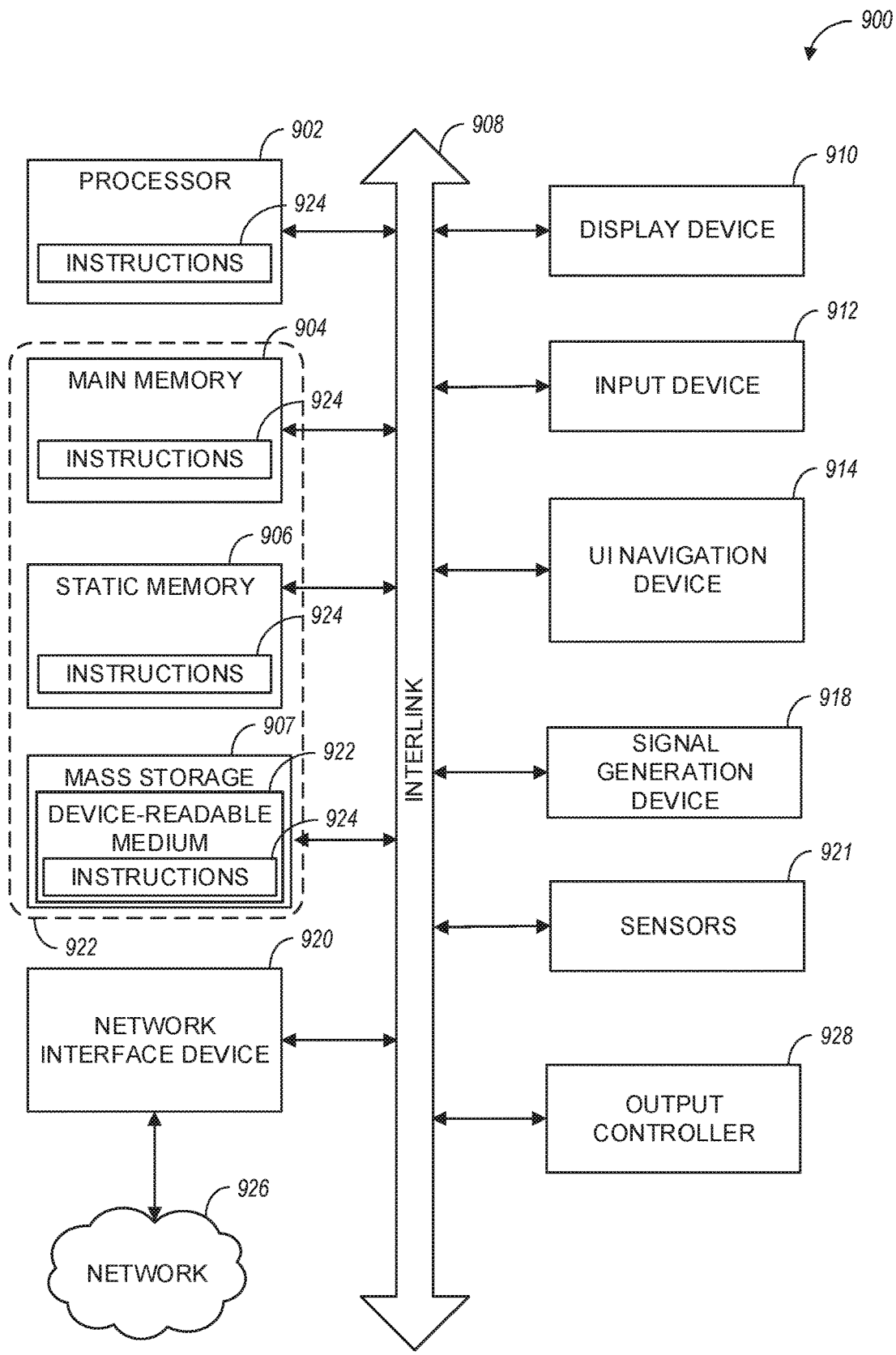
FIG. 9 illustrates a block diagram of a communication device such as an evolved Node-B (eNB), a new generation Node-B (gNB) (or another RAN node), an access point (AP), a wireless station (STA), a mobile station (MS), or a user equipment (UE), in accordance with some aspects.

FIG. 9 illustrates a block diagram of a communication device such as an evolved Node-B (eNB), a new generation Node-B (gNB) (or another RAN node), an access point (AP), a wireless station (STA), a mobile station (MS), or a user equipment (UE), in accordance with some aspects and to perform one or more of the techniques disclosed herein. In alternative aspects, the communication device 900 may operate as a standalone device or may be connected (e.g., networked) to other communication devices.

Circuitry (e.g., processing circuitry) is a collection of circuits implemented in tangible entities of the device 900 that include hardware (e.g., simple circuits, gates, logic, etc.). Circuitry membership may be flexible over time. Circuitries include members that may, alone or in combination, perform specified operations when operating. In an example, the hardware of the circuitry may be immutably designed to carry out a specific operation (e.g., hardwired). In an example, the hardware of the circuitry may include variably connected physical components (e.g., execution units, transistors, simple circuits, etc.) including a machine-readable medium physically modified (e.g., magnetically, electrically, moveable placement of invariant massed particles, etc.) to encode instructions of the specific operation.

In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine-readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the device 900 follow.

In some aspects, the device 900 may operate as a standalone device or may be connected (e.g., networked) to other devices. In a networked deployment, the communication device 900 may operate in the capacity of a server communication device, a client communication device, or both in server-client network environments. In an example, the communication device 900 may act as a peer communication device in a peer-to-peer (P2P) (or other distributed) network environment. The communication device 900 may be a UE, eNB, PC, a tablet PC, an STB, a PDA, a mobile telephone, a smartphone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), and other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client, or server computer system) or one or more hardware processors may be configured by firmware or software (e.g., instructions, an application portion, or an application) as a module that operates to perform specified operations. In an example, the software may reside on a communication device-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using the software, the general-purpose hardware processor may be configured as respective different modules at different times. The software may accordingly configure a hardware processor, for example, to constitute a particular module at one instance of time and to constitute a different module at a different instance of time.

The communication device (e.g., UE) 900 may include a hardware processor 902 (e.g., a central processing unit (CPU), a graphics processing unit (GPU), a hardware processor core, or any combination thereof), a main memory 904, a static memory 906, and a storage device 907 (e.g., hard drive, tape drive, flash storage, or other block or storage devices), some or all of which may communicate with each other via an interlink (e.g., bus) 908.

The communication device 900 may further include a display device 910, an alphanumeric input device 912 (e.g., a keyboard), and a user interface (UI) navigation device 914 (e.g., a mouse). In an example, the display device 910, input device 912, and UI navigation device 914 may be a touchscreen display. The communication device 900 may additionally include a signal generation device 918 (e.g., a speaker), a network interface device 920, and one or more sensors 921, such as a global positioning system (GPS) sensor, compass, accelerometer, or another sensor. The communication device 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 907 may include a communication device-readable medium 922, on which is stored one or more sets of data structures or instructions 924 (e.g., software) embodying or utilized by any one or more of the techniques or functions described herein. In some aspects, registers of the processor 902, the main memory 904, the static memory 906, and/or the storage device 907 may be, or include (completely or at least partially), the device-readable medium 922, on which is stored the one or more sets of data structures or instructions 924, embodying or utilized by any one or more of the techniques or functions described herein. In an example, one or any combination of the hardware processor 902, the main memory 904, the static memory 906, or the mass storage 916 may constitute the device-readable medium 922.

As used herein, the term "device-readable medium" is interchangeable with "computer-readable medium" or "machine-readable medium". While the communication device-readable medium 922 is illustrated as a single medium, the term "communication device-readable medium" may include a single medium or multiple media (e.g., a centralized or distributed database, and/or associated caches and servers) configured to store the one or more instructions 924. The term "communication device-readable medium" is inclusive of the terms "machine-readable medium" or "computer-readable medium", and may include any medium that is capable of storing, encoding, or carrying instructions (e.g., instructions 924) for execution by the communication device 900 and that causes the communication device 900 to perform any one or more of the techniques of the present disclosure, or that is capable of storing, encoding or carrying data structures used by or associated with such instructions. Non-limiting communication device-readable medium examples may include solid-state memories and optical and magnetic media. Specific examples of communication device-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device-readable media may include non-transitory communication device-readable media. In some examples, communication device-readable media may include communication device-readable media that is not a transitory propagating signal.

Instructions 924 may further be transmitted or received over a communications network 926 using a transmission medium via the network interface device 920 utilizing any one of a number of transfer protocols. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input-multiple-output (SIMO), MIMO, or multiple-input-single-output (MISO) techniques. In some examples, the network interface device 920 may wirelessly communicate using Multiple User MIMO techniques.

The term "transmission medium" shall be taken to include any intangible medium that is capable of storing, encoding, or carrying instructions for execution by the communication device 900, and includes digital or analog communications signals or another intangible medium to facilitate communication of such software. In this regard, a transmission medium in the context of this disclosure is a device-readable medium.

The following are some additional example aspects associated with the disclosed techniques.

Example 1 is an apparatus for a user equipment (UE) configured for operation in a Fifth Generation New Radio (5G NR) network, the apparatus comprising: processing circuitry, wherein to configure the UE for a small data transmission (SDT) in the 5G NR network, the processing circuitry is to: detect while in a Radio Resource Control Inactive (RRC_Inactive) state, a radio link failure during a first SDT of uplink (UL) data to a base station; generate a secure key for a second SDT based on the radio link failure; encode a configuration message for transmission to the base station, the configuration message including an indication of the second SDT; decode a response message from the base station, the response message including an UL grant; and encode the UL data for the second SDT, the UL data encoded using the secure key, and the second SDT performed using the UL grant while the UE is in the RRC_Inactive state; and a memory coupled to the processing circuitry and configured to store the secure key.

In Example 2, the subject matter of Example 1 includes subject matter where the processing circuitry is to: decode a second configuration message received from the base station, the second configuration message including at least one next-hop chaining count (NCC) parameter; and generate the secure key for the second SDT using the at least one NCC parameter.

In Example 3, the subject matter of Examples 1-2 includes subject matter where the processing circuitry is to: decode an RRC Release message from the base station, the RRC Release message including a second secure key for the second SDT, and the RRC Release message is decoded after detecting the radio link failure.

In Example 4, the subject matter of Example 3 includes subject matter where the processing circuitry is to: encode the UL data for the second SDT, the UL data encoded using the second secure key.

In Example 5, the subject matter of Examples 3-4 includes subject matter where the UE is temporarily anchored with a previous base station without relocation of a UE context to the base station, and wherein the second secure key is encoded based on a next-hop chaining count (NCC) parameter from the previous base station, the NCC parameter associated with an SDT that has occurred before the first SDT.

In Example 6, the subject matter of Examples 1-5 includes subject matter where the processing circuitry is to: perform a horizontal key derivation to generate the secure key for the second SDT; and encode a count of the horizontal key derivation for transmission to the base station, to trigger synchronization of the generated secure key with the base station.

In Example 7, the subject matter of Examples 1-6 includes subject matter where the processing circuitry is to: encode the UL data for the second SDT with a packet data convergence protocol (PDCP) service data unit (SDU) level or radio link control (RLC) level that is the same as a PDCP SDU level or an RLC level associated with the first SDT.

In Example 8, the subject matter of Examples 1-7 includes subject matter where the processing circuitry is to: decode configuration signaling from the base station before detecting the radio link failure, the configuration signaling indicating a robust header compression (RoHC) configuration associated with one or more cells of the base station or a radio access network (RAN) notification area (RNA).

In Example 9, the subject matter of Example 8 includes subject matter where the processing circuitry is to: perform a RoHC during the second SDT based on a current cell of the UE being part of the one or more cells or the current cell of the UE being within the RNA.

In Example 10, the subject matter of Examples 1-9 includes, transceiver circuitry coupled to the processing circuitry; and one or more antennas coupled to the transceiver circuitry.

Example 11 is a non-transitory computer-readable storage medium that stores instructions for execution by one or more processors of a base station, the instructions to configure the base station for a small data transmission (SDT) in a Fifth Generation New Radio (5G NR) network, and to cause the base station to perform operations comprising: detecting a radio link failure during a first SDT of uplink (UL) data from a user equipment (UE) in a Radio Resource Control Inactive (RRC_Inactive) state; encoding a configuration message for transmission to the UE based on the radio link failure, the configuration message including at least one next hop chaining count (NCC) parameter; decoding a second configuration message from the UE, the second configuration message including an indication of a second SDT; encoding a response message for transmission to the UE in response to the second configuration message, the response message including an UL grant; and decoding the UL data for the second SDT, the UL data encoded using a secure key based on the at least one NCC parameter, and the UL data received based on the UL grant while the UE is in the RRC_Inactive state.

In Example 12, the subject matter of Example 11 includes, the operations further comprising: encoding a second configuration message for transmission to the UE before detecting the radio link failure, the second configuration message indicating a robust header compression (RoHC) configuration associated with one or more cells of the base station or a radio access network (RAN) notification area (RNA), and decoding the UL data during the second SDT and based on the RoHC configuration.

Example 13 is a non-transitory computer-readable storage medium that stores instructions for execution by one or more processors of user equipment (UE), the instructions to configure the UE for small data transmission (SDT) in a Fifth Generation New Radio (5G NR) network and to cause the UE to perform operations comprising: detecting while in a Radio Resource Control Inactive (RRC_Inactive) state, a radio link failure during a first SDT of uplink (UL) data to a base station; generating a secure key for a second SDT based on the radio link failure; encoding a configuration message for transmission to the base station, the configuration message including an indication of the second SDT; decoding a response message from the base station, the response message including a UL grant; and encoding the UL data for the second SDT, the UL data encoded using the secure key, and the second SDT performed using the UL grant while the UE is in the RRC_Inactive state.

In Example 14, the subject matter of Example 13 includes, the operations further comprising: decoding a second configuration message received from the base station, the second configuration message including at least one next-hop chaining count (NCC) parameter; and generating the secure key for the second SDT using the at least one NCC parameter.

In Example 15, the subject matter of Examples 13-14 includes, the operations further comprising: decoding an RRC Release message from the base station, the RRC Release message including a second secure key for the second SDT, and the RRC Release message is decoded after detecting the radio link failure.

In Example 16, the subject matter of Example 15 includes, the operations further comprising: encoding the UL data for the second SDT, the UL data encoded using the second secure key.

In Example 17, the subject matter of Examples 15-16 includes subject matter where the UE is temporarily anchored with a previous base station without relocation of a UE context to the base station, and wherein the second secure key is encoded based on a next-hop chaining count (NCC) parameter from the previous base station, the NCC parameter associated with an SDT that has occurred before the first SDT.

In Example 18, the subject matter of Examples 13-17 includes, the operations further comprising: performing a horizontal key derivation to generate the secure key for the second SDT; and encoding a count of the horizontal key derivation for transmission to the base station, to trigger synchronization of the generated secure key with the base station.

In Example 19, the subject matter of Examples 13-18 includes, the operations further comprising: encoding the UL data for the second SDT with a packet data convergence protocol (PDCP) service data unit (SDU) level or radio link control (RLC) level that is the same as a PDCP SDU level or an RLC level associated with the first SDT.

In Example 20, the subject matter of Examples 13-19 includes, the operations further comprising: decoding configuration signaling from the base station before detecting the radio link failure, the configuration signaling indicating a robust header compression (RoHC) configuration associated with one or more cells of the base station or a radio access network (RAN) notification area (RNA); and performing a RoHC during the second SDT based on a current cell of the UE being part of the one or more cells or the current cell of the UE being within the RNA.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

Although an aspect has been described with reference to specific exemplary aspects, it will be evident that various modifications and changes may be made to these aspects without departing from the broader scope of the present disclosure. Accordingly, the specification and drawings are to be regarded in an illustrative rather than a restrictive sense. This Detailed Description, therefore, is not to be taken in a limiting sense, and the scope of various aspects is defined only by the appended claims, along with the full range of equivalents to which such claims are entitled.

What is claimed is:

1. An apparatus for a user equipment (UE) configured for operation in a Fifth Generation New Radio (5G NR) network, the apparatus comprising:
   processing circuitry, wherein to configure the UE for small data transmission (SDT) in the 5G NR network, the processing circuitry is to:
      encode a first radio resource control (RRC) message to include uplink (UL) SDT data for transmission to a base station, the first RRC message encoded for transmission to the base station while the UE is in RRC_INACTIVE state; and
      decode a second RRC message received from the base station during the RRC_INACTIVE state, the second RRC message including downlink (DL) SDT data, the encoding of the first RRC message and the second RRC message based on multiplexing SDT data using at least one data radio bearer (DRB) and RRC signaling using at least one signaling radio bearer (SRB); and
   a memory coupled to the processing circuitry and configured to store the first RRC message and the second RRC message.

2. The apparatus of claim 1, wherein the first RRC message is an RRCResumeRequest message, and wherein the second RRC message is an RRCRelease message.

3. The apparatus of claim 2, wherein the RRCRelease message indicates the DL SDT data is transmitted based on robust header compression (RoHC) in a cell of the base station.

4. The apparatus of claim 2, wherein the RRCRelease message indicates the DL SDT data is transmitted based on robust header compression (RoHC) in a cell within a radio access network (RAN) notification area (RNA) of the base station.

5. The apparatus of claim 1, wherein the processing circuitry is to:
   encode the UL SDT data based on a next hop chaining count (NCC) value received in a prior RRC message transmission by the base station.

6. The apparatus of claim 5, wherein the processing circuitry is to:
   generate a secure key based on the NCC value; and
   encode the UL SDT data using the secure key.

7. The apparatus of claim 1, wherein the processing circuitry is to:
   decode a next hop chaining count (NCC) value based on the second RRC message.

8. The apparatus of claim 7, wherein the processing circuitry is to:
   perform a key derivation process to generate a secure key based on the NCC value; and
   encode second UL SDT data for transmission to the base station based on the secure key.

9. The apparatus of claim 1, further comprising:
   transceiver circuitry coupled to the processing circuitry; and
   one or more antennas coupled to the transceiver circuitry.

10. A non-transitory computer-readable storage medium that stores instructions for execution by one or more processors of a base station, the instructions to configure the base station for small data transmission (SDT) in a Fifth Generation New Radio (5G NR) network, and to cause the base station to perform operations comprising:
    decoding a first radio resource control (RRC) message received from a user equipment (UE), the first RRC message including uplink (UL) SDT data and the first RRC message received while the UE is in RRC_INACTIVE state; and
    encoding a second RRC message for transmission to the UE during the RRC_INACTIVE state, the second RRC message including downlink (DL) SDT data, and the encoding of the first RRC message and the second RRC message based on multiplexing SDT data using at least one data radio bearer (DRB) and RRC signaling using at least one signaling radio bearer (SRB).

11. The non-transitory computer-readable storage medium of claim 10, wherein the first RRC message is an RRCResumeRequest message, and wherein the second RRC message is an RRCRelease message.

12. The non-transitory computer-readable storage medium of claim 11, wherein the RRCRelease message indicates the DL SDT data is transmitted based on robust header compression (RoHC) in a cell of the base station.

13. The non-transitory computer-readable storage medium of claim 11, wherein the RRCRelease message indicates the DL SDT data is transmitted based on robust header compression (RoHC) in a cell within a radio access network (RAN) notification area (RNA) of the base station.

14. A user equipment (UE) configured for operation in a Fifth Generation New Radio (5G NR) network, the UE comprising:
    front-end circuitry coupled to one or more antennas;
    processing circuitry coupled to the front-end circuitry, the processing circuitry is to:
        encode a first radio resource control (RRC) message to include uplink (UL) small data transmission (SDT) data for transmission to a base station via the one or more antennas, the first RRC message encoded for transmission to the base station while the UE is in RRC_INACTIVE state; and
        decode a second RRC message received from the base station during the RRC_INACTIVE state, the second RRC message including downlink (DL) SDT data, the encoding of the first RRC message and the second RRC message based on multiplexing SDT data using at least one data radio bearer (DRB) and RRC signaling using at least one signaling radio bearer (SRB); and
    a memory coupled to the processing circuitry and configured to store the first RRC message and the second RRC message.

15. The UE of claim 14, wherein the first RRC message is an RRCResumeRequest message, and wherein the second RRC message is an RRCRelease message.

16. The UE of claim 15, wherein the RRCRelease message indicates the DL SDT data is transmitted based on robust header compression (RoHC) in a cell of the base station.

17. The UE of claim 15, wherein the RRCRelease message indicates the DL SDT data is transmitted based on robust header compression (RoHC) in a cell within a radio access network (RAN) notification area (RNA) of the base station.

18. The UE of claim 14, wherein the processing circuitry is to:
    encode the UL SDT data based on a next hop chaining count (NCC) value received in a prior RRC message transmission by the base station.

19. The UE of claim 18, wherein the processing circuitry is to:
    generate a secure key based on the NCC value; and
    encode the UL SDT data using the secure key.

20. The UE of claim 14, wherein the processing circuitry is to:
    decode a next hop chaining count (NCC) value based on the second RRC message;
    perform a key derivation process to generate a secure key based on the NCC value; and
    encode second UL SDT data for transmission to the base station based on the secure key.

* * * * *